United States Patent
MacPhail

(10) Patent No.: US 6,735,772 B1
(45) Date of Patent: May 11, 2004

(54) SYSTEM AND METHOD FOR HANDLING ORPHANED CAUSE AND EFFECT OBJECTS

(75) Inventor: Margaret Gardner MacPhail, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/548,594

(22) Filed: Apr. 13, 2000

(51) Int. Cl.[7] ................................................. G06F 9/44
(52) U.S. Cl. ........................ 719/315; 719/316; 719/318; 707/206; 716/1; 706/28
(58) Field of Search ................................. 709/318, 315, 709/316; 707/206; 716/1, 18; 706/21–34, 45–62; 719/318, 315, 316

(56) References Cited

U.S. PATENT DOCUMENTS

| | | | |
|---|---|---|---|
| 5,375,070 A | | 12/1994 | Hershey et al. ............. 364/550 |
| 5,504,921 A | * | 4/1996 | Dev et al. ................... 709/223 |
| 5,539,877 A | | 7/1996 | Winokur et al. ....... 395/183.02 |
| 5,572,733 A | * | 11/1996 | Ryu et al. ................... 717/104 |
| 5,586,326 A | * | 12/1996 | Ryu et al. ................... 717/104 |
| 5,594,836 A | * | 1/1997 | Ryu et al. ..................... 706/53 |
| 5,704,028 A | * | 12/1997 | Schanel et al. ............. 345/440 |
| 5,751,914 A | * | 5/1998 | Coley et al. .................. 706/47 |
| 5,805,785 A | | 9/1998 | Dias et al. ............. 395/182.02 |
| 5,937,189 A | | 8/1999 | Branson et al. ............. 395/701 |
| 6,226,693 B1 | * | 5/2001 | Chow et al. ................ 709/318 |
| 6,243,697 B1 | * | 6/2001 | Crowther ..................... 706/50 |
| 6,263,486 B1 | * | 7/2001 | Boezeman et al. ......... 717/108 |
| 6,268,852 B1 | * | 7/2001 | Lindhorst et al. ........... 345/744 |
| 6,374,293 B1 | * | 4/2002 | Dev et al. ................... 709/220 |
| 6,480,877 B1 | * | 11/2002 | O'Donnell et al. ......... 709/100 |
| 6,496,850 B1 | * | 12/2002 | Bowman-Amuah ......... 709/203 |
| 6,577,597 B1 | * | 6/2003 | Natarajan et al. ........... 370/232 |
| 6,584,502 B1 | * | 6/2003 | Natarajan et al. ........... 709/224 |

OTHER PUBLICATIONS

Puaut, Isabelle. "A Distributed Garbage Collector for Active Objects". ACM. 1994.*
Harrison, Timothy et al. "The Design and Performance of a Real–time COBRA Event Service." ACM 1997.*
OMG. "Common Object Services Specification, vol. 1". Revision 1.0, First edition, Mar. 1, 1994.*
Computer Associates. "Unicenter TNG Framework." Version 2.0 Admistrator Guide. 1997.*
Bescos et. al., "A Rule–based Event Manager for the Tivoli/Enterprise Console," Proceedings Paper 1995. The Third International Conference. Practical Application of Prolog. Paris, France. Publ. Alinmead Software. Doc. No. INS 953605721. Apr. 3–6, 1995. pp. 43–51.

* cited by examiner

Primary Examiner—John Follansbee
Assistant Examiner—Lewis A. Bullock, Jr.
(74) Attorney, Agent, or Firm—Leslie A. Van Leeuwen; Joseph T. Van Leeuwen

(57) ABSTRACT

Cause and effect event objects are created in response to conditions occurring in a system. The object space may be contained on a single system or may span across several systems connected with a computer network. As system events change, a correlation circuit may be changed or removed as a result. Individual objects may not be properly removed from the object space and may be orphaned from their correlation circuits. A orphan handler identifies objects that may be potential orphan objects based on factors. Factors may include the amount of time the object exists in the object space and whether the object is not currently correlated with other objects in the object space. When an orphaned object is identified, it can be automatically removed from the object space. Orphaned objects can be viewed by system administrators to determine whether the object exists in response to a particular system event.

20 Claims, 14 Drawing Sheets

SYSTEM AND METHOD FOR HANDLING ORPHANED CAUSE AND EFFECT OBJECTS

RELATED APPLICATIONS

This application is related to the following co-pending U.S. Patent Application filed on the same day as the present application and having the same inventor and assignee: "System and Method Associating Causal Events with Predicted Effects," "System and Method Associating Effects with Predicted Causes," "System and Method Correlating Causes and Effects," "System and Method For User Created Cause and Effect Correlations," "System and Method For Dynamic Generation and Clean-up of Event Correlation Circuit," and "System and Method For Dynamic Modification of Monitoring Criteria" by MacPhail.

BACKGROUND

1. Field of the Invention

The present invention relates to information processing technology. More particularly, the present invention relates to a system and method for handling and cleaning up cause and effect objects that are orphaned from one another.

2. Description of the Related Art

One of the highest priorities of information technology (IT) organizations responsible with managing mission-critical computing environments is to ensure that problems, as well as conditions that could lead to problems, are handled in a timely and efficient manner. Event correlation managers are software systems that are designed to collect and respond to events that occur in the computer system. Events may come from a variety of sources. Examples include events that occur: (1) when a link to another computer system goes down, (2) when a router used for routing information goes down, (3) when a database is down, (4) when the system processor is maximized, or "pegged," for an extended period, (5) when a disk is full, (6) when one or more applications that make up a critical business function (i.e., order entry) go down, (7) when a critical application program's performance degrades beyond an acceptable level, and (8) when a host computer is going down.

As used herein, a "business system" serves the needs of the organization's critical functions, such as order entry, marketing, accounts receivable, and the like. A business system may span several dissimilar types of computers and be distributed throughout many geographical locations. A business system, in turn, is typically based upon several application programs. An application program may also span several dissimilar types of computers and be distributed throughout a network of computer systems.

An application typically serves a particular function that is needed by the business system. An individual application program may, or may not, be critical to the business system depending upon the role the application program plays within the overall business system. Using networked computers, an application may span several computer systems. In an Internet commerce system, for example, an application program that is part of the company's order processing business system, may be responsible for serving web pages to users browsing the companies online catalog. This application may use several computer systems in various locations to better serve the customers and provide faster response to customer inquiries.

The application may use some computers running one type of operating system, for example a UNIX-based operating system such as IBM's AIX® operating system, while other computer systems may run another type of server operating system such as Microsoft's Windows NT® Server operating system. Individual computer systems work together to provide the processing power needed to run the business systems and application programs. These computer systems may be mainframes, mid-range systems, workstations, personal computers, or any other type of computer that includes at least one processor and can be programmed to provide processing power to the business systems and applications.

Computer systems, in turn, include individual resources that provide various functionality to the computer systems. For example, a modem is an individual resource that allows a computer system to link to another computer system through an communication network. A router is another individual resource that routes electronic messages between computer systems. Indeed, even an operating system is an individual resource to the computer system providing instructions to the computer system's one or more processors and facilitating communication between the various other individual resources that make up the computer system. Events, as described herein, may effect an entire business system, an application program, a computer system, or an individual resource depending upon the type of event that occurs.

The number and types of events that may occur vary widely from system to system based upon the system characteristics, load, and desired use of the system. An business system providing content from an Internet site may experience different events than a business system used to process a the company's payroll. However, many events between dissimilar systems overlap. For example, many computer systems experience problems when the disk space is full and many computer systems experience problems when the system's processor is pegged. The types of problems these events cause, however, will vary depending upon the types of work that the business system is expected to perform.

In the Internet site example, a pegged processor is likely to result in applications interfacing with Internet users to become stalled or unusable and transaction throughput to stall or become exceedingly slow. In the corporate payroll system, the same pegged processor may result in critical software applications that make up the payroll application stalling or becoming exceedingly slow. The causes of the pegged processor may also be different depending upon the usage of the computer. An Internet server's processor may become pegged due to receiving more requests from Internet users than can be handled. The corporate payroll system's processor may have become pegged due to multiple processor-intensive business applications running simultaneously on the system.

Traditional event correlation managers are usually designed as hierarchical rule-based systems. After an event monitor detects a certain event, the correlation manager processes the event using the rules that have been predefined in the system in order to determine the likely cause of the event. Software vendors providing event correlation managers often provide a rule editor that allows customers to edit the rules that apply to the customer's system.

Event correlation managers typically receive signals, or messages, from event monitors that monitor business systems, applications, computer systems, and individual resources (collectively, "business system and components"). These event monitors are often programmed to filter information from the business system and components being monitored. The filtering criteria is often preset so that certain conditions are filtered out as non-problems while other conditions are trapped and correspondingly sent to event correlation managers for processing the given event. Traditional event monitors are challenged by the fact that the filtering criteria is preset or coded into the event monitor itself making it difficult or impossible to dynamically alter the monitoring criteria used for a particular device or piece of software. Traditional event correlation managers, like their traditional event monitor counterparts, also face challenges in dealing with the complexities of today's modern business system and components.

One challenge with traditional event correlation managers is that the creation, modification, and maintenance of the rule base is a centralized activity resulting in a centralized set of rules. An area or individual within the IT organization may be responsible for updating the rules. However, with the complexity of modern business system and components, it is unlikely that one person or even one area will be the most knowledgeable about all of the event producing hardware and software in the business system and components nor will such person or area likely be the most knowledgeable concerning the possible effects that occur when a certain event occurs. It is also unlikely that centralized IT individuals or groups will be the most knowledgeable about what corrective action should be implemented when a certain event occurs. The IT group may have sufficient knowledge to allocate additional disk space if a disk full condition arises, however the same group may not have expertise with a certain database management system (DBMS) that may crash or perform below a minimal acceptable threshold, nor may that group have sufficient knowledge regarding the business system and components. In the database example, a database administrator (DBA) with particular expertise would likely be a better source of knowledge with actions to take when certain database conditions occur.

Involving various knowledge base employees with expertise in particular fields is further challenged by a centralized rule-based hierarchical event correlation manager because one area, typically the IT organization, controls the maintenance of the correlation manager. Receiving input from other people in various parts of an organization presents logistic and managerial challenges that traditional systems have difficulty handling.

Another challenge faced by traditional event correlation managers is the complexity of the rules and the complexity of the hierarchy structure of the rule base. As business systems and components become more complex, the events that may occur, both the causes and the effects, become ever more complex. A rule base is often organized in a hierarchy of nested "if-then-else" types of conditions. As an example, consider the following pseudo-code that might exist in an event correlation manager's rule base pertaining to one particular critical application:

```
IF critical_application_down THEN DO
    IF link_down THEN DO
        CALL NOTIFY_NETWORK_ADMIN
        . . .
    END
    IF database_down THEN DO
        IF disk_space_full THEN DO
            . . .
        END
    END
    IF processor_pegged THEN DO
        IF large_application_running THEN DO
            MESSAGE TO large_application to halt
            CALL LARGE_APPL_SUPPORT
        END
        ELSE
            CALL NOTIFY_ADMINISTRATOR
        IF . . .
    END
    . . .
    EXIT
END // end critical_application_down section
```

As illustrated by the above-example, the rules-based approach often results in a large nested set of rules that becomes increasingly complex as the computer system changes or evolves. Changes made to the business system and components may not be reflected in the rule base until certain errors have occurred, been diagnosed, and entered in the rule base. The resulting rule base becomes exceedingly complex, and therefore, exceedingly difficult to manage as the computer system evolves and increases in complexity. When changes are made to the computer system are not reflected in the rule base, the event correlation manager cannot manage the events and take the corrective action necessary. In addition, making changes to the business system and components without making corresponding changes to the rule base may result in phantom errors with the system trying to act upon computer system hardware and software that may no longer exist in the business system. For example, one of the events corresponding to the critical_ application_down error in the above example is if a database is down. If the database is replaced or moved to a different system, the database_down condition may exist because of the system change, not because the database is actually down. The result of such phantom errors may be performing unnecessary, and potentially harmful, corrective actions and causing further confusion amongst the IT personnel as to which events have cause the current system outages and failures.

The complex hierarchical structure of traditional event correlation managers, coupled with the centralized maintenance of such systems, creates a formidable task for IT personnel to manage. This task is especially difficult in the face of increasing complexity of business systems and an ever-widening array of components and applications that comprise today's modern business system.

SUMMARY

It has been discovered that a dynamic object-oriented approach to correlating events in a computer system has certain advantages desirable over traditional static hierarchical rule-based event correlation managers found in the prior art. A dynamic object-oriented approach allows for a more simplistic structure correlating events, including causes of events and effects of such events, found in a computer system. The dynamic object-oriented approach allows expertise of various areas or individuals to be brought together as needed without one individual or area responsible for understanding all aspects of the computer system.

In the dynamic object-oriented approach, object templates are created by the subject matter expert for each type of event needed to be handled by the system. Individual subject matter experts, organizational areas, or third-party vendors provide expertise related to efficient and precise handling of given events. These object templates can be created with little knowledge of other events that may occur in the computer system. Object templates include logic for responding to the particular event. For example, a database_ down event object may include a program call to a database management system utility to attempt to fix the database problem, send an email message to an administrator for intervention, and send a message to a pager carried by the database administrator responsible for the database. In fact, the database administrator, likely having greater knowledge of the database than general IT personnel, may be the subject matter expert responsible for maintaining the database_ down object template without need of a central hierarchical rule base. The object templates are repeatedly refined and fine tuned in an ongoing process that accounts for changes in the business system and components as well as a better understanding of the component being monitored and better understanding of the causes that cause the component to fail and the down-stream effects that a failure in the component, such as the database, causes.

After object templates are created, correlations are created between cause event objects and effect event objects by users that need not have the same expertise as the subject matter expert that created the object templates. The correlations created between objects enable the objects to logically find one another after an event monitor causes an object to be created. Cause event objects can be directly correlated to effect objects in a one-to-one relationship or multiple cause event objects can be correlated to effect event objects through logical constructs. Multiple cause event objects are correlated to effect event objects using logical constructs such as "OR," "exclusive or" (XOR), "not OR" (NOR), "AND," and "not AND" (NAND). In this manner, a predicted effect object can be correlated to multiple causes. By correlating predicted causes with effects and predicted effects with causes, the user can create cause-effect correlations.

Cause events are dynamically correlated to effect events, and effect events are in turn dynamically correlated to cause events, through a subscription mechanism used with the various cause and effect events. In this manner, when created, a given cause event object will send a message to all other objects (i.e., effect event objects) that are subscribed to the given cause event object. Likewise, a given effect event object, when created, will send a message to all other objects (i.e., cause event objects) that are subscribed to the given effect event object. Through the subscription mechanism, cause and effect objects will locate each other, dynamically creating a correlation circuit, whenever a cause or effect object is created in the system, regardless of which object was created first by the dynamic object-oriented event correlation system.

After an event correlation circuit has been dynamically generated by the system, it is dynamically cleaned up once the events causing the event correlation circuit have been handled. One way to clean up an event correlation circuit is to create a new clean up event that is created by the event monitor once the condition causing the event no longer exists. The cause or effect object is subscribed to the clean up object and responds to the existence of the clean up object by terminating its processing. In addition, objects can be self-monitoring so that they determine when to terminate without needing to receive external commands. In this manner, an object can monitor system characteristics and determine when the event no longer exists and terminate automatically.

Another way an event correlation circuit can be cleaned up is by providing a clean up object that is sent by an administrator to clean up one or more event correlations. In this manner, global or semi-global clean up commands can be issued by the administrator, or automated process, cleaning up one or multiple event correlation circuits. A further way of cleaning up an event correlation circuit is provided by a time-based constraint on the individual object or on the event correlation circuit. After a prescribed length of time, the event correlation circuit would terminate. However, if the condition for dynamically creating the event correlation circuit still exists, the event monitors would once again create the appropriate cause and effect objects recreating the event correlation circuit. On the other hand, if the conditions for the event correlation circuit no longer exist (indicating that the event correlation circuit is no longer applicable to current state of the system) the event monitors would not re-create the cause and effect event objects and the correlation circuit would simply cease to exist.

Event monitors that monitor for a given event are also object-oriented to allow for dynamic changes to the criteria used by the monitor in monitoring specific events. Data collected by the event monitor are, in turn, used to create a self-examining event monitor object based on dynamic criteria set by the event monitor itself or based upon another system analysis software component. Dynamically adjusting the event monitoring criteria allows for fine tuning the event monitor to the latest needs and capabilities of the computing environment. Event monitoring criteria are supplied by system administrators issuing change requests to event monitoring criteria in addition to dynamic criteria changes performed by the event monitor and other system analysis software. Event criteria changes are alternatively time-based whereupon such changes exist for a certain time interval before reverting back to the original preset criteria.

Event criteria changes are also alternatively based upon other events so that when another event object is either created or destroyed, the event criteria again reverts back to the original preset values. For example, a disk_full event may normally be triggered when the disk drive event monitor senses that the disk drive is 90% full. Based on a self-assessment, the disk drive event monitor may reset its own threshold to 95% if it determines the system processor is operating below a certain utility level (i.e., little swap space is being utilized). Alternatively, a system administrator or external process may raise the threshold temporarily to 95% when running an application that will create large temp files that will be erased within a certain time period.

The dynamic object-oriented cause/effect correlations and dynamic monitoring criteria provide distinct advantages over the hierarchical, rule-based event correlation managers found in traditional systems. The dynamic object-oriented cause/effect correlations are better able to manage complex business systems that static, hierarchical rule-based correlation managers. Dynamic event monitors also provide a more flexible and adaptable filtering mechanism for monitoring events in complex business systems than traditional event monitors.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
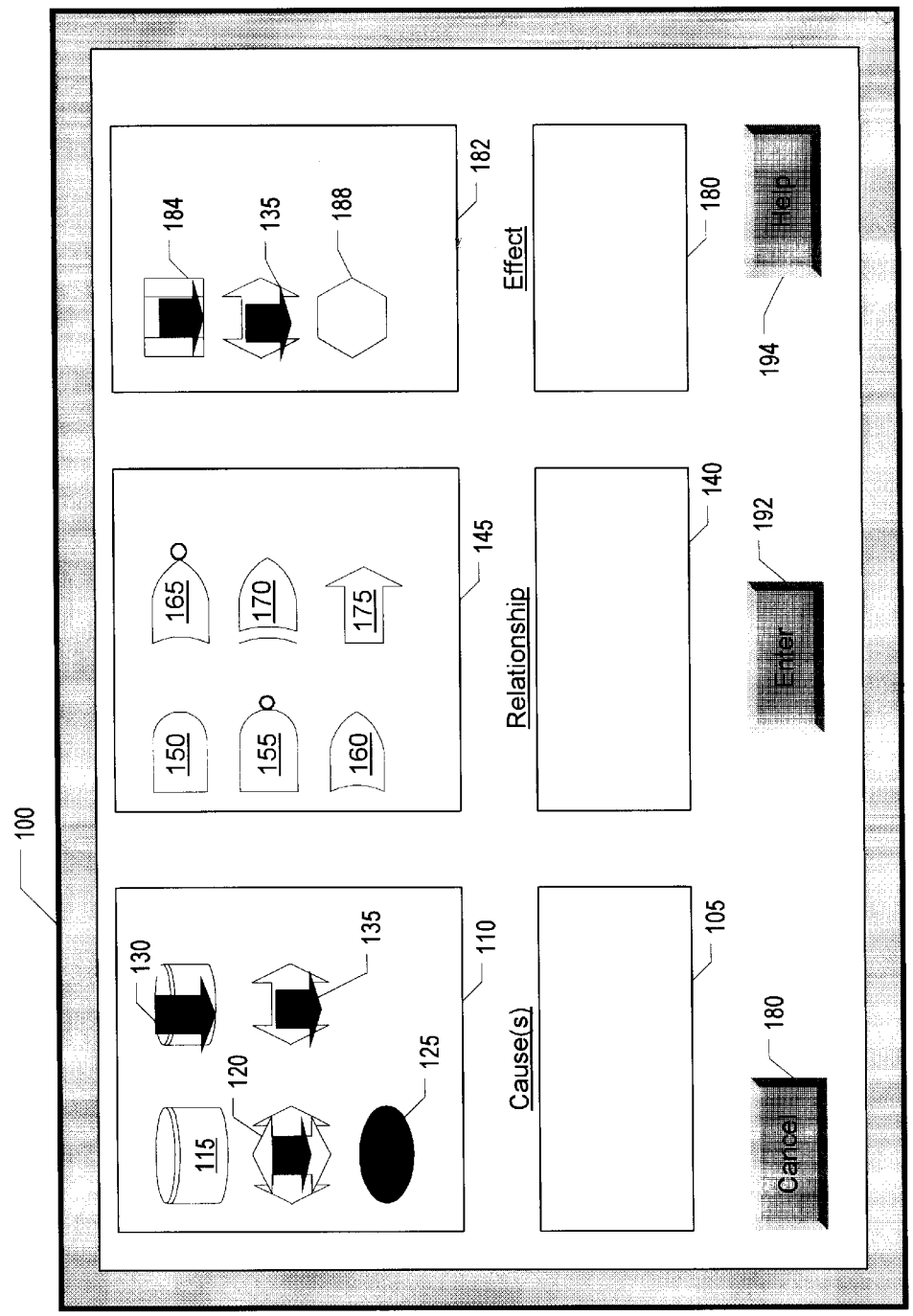
FIG. 1 is a sample screen used by a user to correlate cause events with effect events.

FIG. 1 is a sample screen that would be used by a user to correlate cause events with effect events. Correlation screen 100 contains three palates from which the user selects graphical icons: cause palate 110 contains the available cause events available on the computer system; relationship palate 145 contains graphical representations of logical relationships that can be used by the user to correlate causes with effects; and effect palate 182 contains the available effect events available on the computer system. In the sample system shown, cause palate contains disk full icon 115, router down icon 120, processor pegged icon 125, database down icon 130, and link down icon 135. Depending on the system, a wide array of cause event icons could appear in the system allowing the cause event palate to reflect the possible cause events occurring in the system. Relationship palate 145 contains logical AND icon 150, logical NAND (not-AND) icon 155, logical OR icon 160, logical NOR (not-OR) icon 165, logical XOR (exclusive-OR) icon 170, and one-to-one icon 175. Effect palate 182 contains application down icon 184, link down icon 135, and application performance icon 188. Notice that link down icon 135 appears as both a possible cause (in cause palate 110) as well as a possible effect (in effect palate 182). Indeed, many components of a business system, such as application programs, computer systems, and individual resources, may be the cause of other components failing in the business system. These same components may also be effected by another component failing in the business system. Stringing cause events with corresponding effect events creates a cause-effect circuit. Similarly to the icons shown in cause palate 110, effect palate 182 will typically vary in the number and types of effects In order to correlate cause events with effect events in sample correlation screen 100, the user completes screen 100 until he or she is satisfied and then presses enter button 192 to complete the object correlations. The user drags the cause effect icon(s) from cause palate 110 to cause window 105. The user also chooses a logical relationship icon from relationship palate 145 and drags it into relationship window 140. If one cause event icon is placed into cause window 105, the user would use one-to-one icon 175 signifying that the chosen cause has a one-to-one relationship with an effect. If more than one cause event icons are placed in cause window 105, the user would use a relationship other than one-to-one icon 175. For example, if an application typically goes down (effect) when either the disk is full or the database is down, logical OR icon 160 would be used as the relationship icon. On the other hand, if the application usually goes down only when both the disk is full and the database is down, logical AND icon 150 would be chosen.

In one embodiment, the user has an additional space to drag or otherwise describe actions that should be performed by the object. For example, the user could specify to have a certain phone number dialed in order to page a person responsible for maintaining the system. The user could also select an email message to be sent to a certain email address and could also type the email message text that would let the user know what event has occurred.

The user also drags the desired effect icon into effect window 180. When the user has placed the desired cause effect icon(s) in cause window 105, the relationship in relationship window 140, and the effect icon in effect window 180, the user selects enter button 192 whereupon the correlation between the cause event(s) and effect event is processed (as will be seen in FIG. 5). If the user does not wish to establish the correlation, he or she selects cancel button 190 to leave correlation screen 100. If the user needs help in operating correlation screen 100, he or she selects help button 194.

Figure 2:
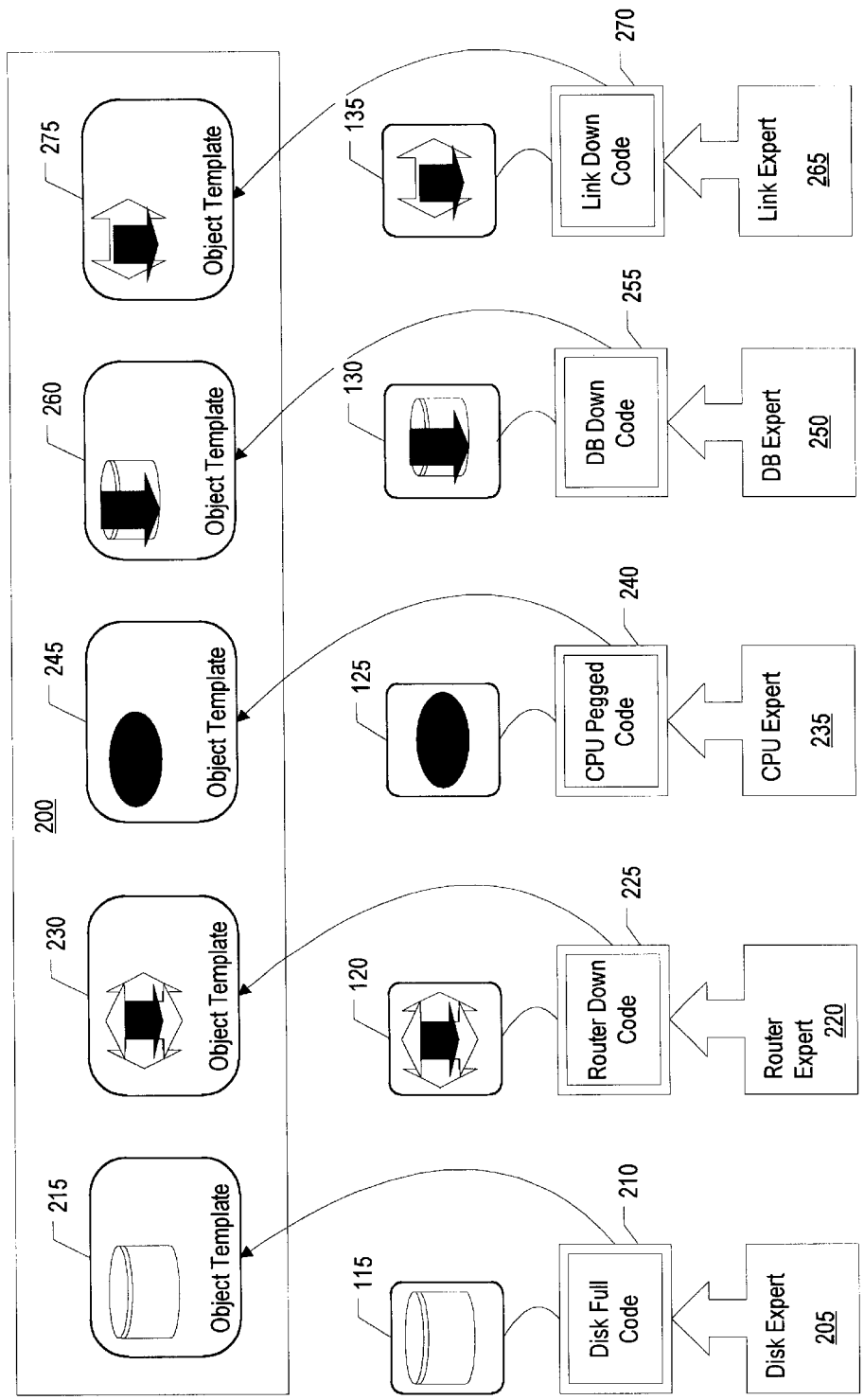
FIG. 2 is a diagram showing the creation of cause event templates by various subject matter experts.

FIG. 2 shows the creation of object templates for the cause event icons shown in FIG. 1. Objects can include actions to take when a certain event takes place in the system. Object factory 200 is a repository for object templates corresponding with various system events. Object factory 200 contains the library of object templates that can be created in an object space to correlate events in the system. Because the actions associated with particular events are contained within objects, subject matter experts that design, code, and maintain an object relating to a particular component of the system need not know details and interrelations between the events that take place in the computer system.

As shown, disk subject matter expert 205 prepares disk full code 210 that describes what actions should be taken when a disk full event arises. The disk full code is logically associated with disk full icon 115. When completed, disk full object template 215 is placed in object factory 200. Disk subject matter expert 205 can thereafter tweak and fine tune disk full object template according to discoveries made about the computer system or based upon managerial or other IT related changes. Disk subject matter expert 205 can fine tune and modify disk full object template 215 without needing to have full knowledge of the other object templates in object factory 200. In addition, disk drive manufacturers or third party software vendors can supply disk full object template 215 that can be fine tuned by using configuration tools that ask the customer about preferences and various actions that can be taken with respect to a disk full event taking place on the customer's computer system.

While shown as code, the code shown, such as disk full code 210, would preferably be created by a subject matter expert by using a software toolkit and dragging various components to create the code. Reusing components to create code takes advantage of the reusability inherent in object oriented programming languages and allows the subject matter expert to concentrate on the actions to be performed by the object rather than the mundane coding of individual lines of code. In this manner, the subject matter expert can spend less time on coding and more time developing further expertise and refining the object actions. Therefore, as described herein, the use of "coding" object templates includes the creation of program objects using toolkits and other reusable components.

Router subject matter expert 220 prepares router down code 220 that describes what actions should be taken when a router down event takes place. The router down code is logically associated with router down icon 120. When completed, router down object template 230 is placed in object factory 200 along with disk down object template 215 and the other object templates. Router subject matter expert 220 can thereafter fine tune router down object template 230 similarly as disk full object template 215 is maintained by disk subject matter expert 205. Again, router subject matter expert 220 can fine tune and modify router down object template 230 without needing to have full knowledge of the other object templates in object factory 200.

Likewise, router manufacturers or third party software vendors can supply router down object template 230 for routers that can be configured by customers regarding the customer's preferences and various actions that can be taken with respect to a router down event taking place on the customer's computer system. For example, a software vendor may provide a utility program that programmatically resets or restarts a router when it goes down. A customer can buy this utility and incorporate it with router down object template 230 so that, when a router down event occurs, the system automatically attempts to reset or restart the router without any human intervention. If the reset/restart is unsuccessful, router down object template 230 could be programmed to then notify an administrator of the router failure or take some other course of corrective action.

Other cause event object templates are created by subject matter experts in a similar fashion as the disk full object template and router down object template are created as described above. Processor subject matter expert 235 develops processor pegged program code 240 and associates processor pegged program code with processor pegged icon 125 and places processor pegged program code 240 into object factory 200 as processor pegged object template 245. Database subject matter expert 250 develops database down program code 255 and associates database down program code 255 with database down icon 130 and places database down program code into object factory 200 as database down object template 260. Finally, Link subject matter expert 265 develops link down program code 270 and associates link down program code 270 with link down icon 135 and places link down program code into object factory 200 as link down object template 275. Other system components that are potential cause events would be written, associated with their respective icons, and placed into object factory 200 as needed.

As shown in FIG. 2, many different subject matter experts can develop code to act when a particular system event occurs. The subject matter experts do not need to know the internal workings, functionality, or even existence of other object templates that are in the system. In this fashion, a certain object template developed for one system can be ported to a different system even if the two systems vary in terms of components and functionality. Third party vendors specializing in utilities to handle system events can use their expertise to develop sophisticated event objects that handle common events that occur in many computer systems. Likewise, custom application programs written for a system can have associated object templates in object factory 200 and these custom applications can thereby be correlated with other system components as either a possible cause event, a possible effect event, or both.

Figure 3:
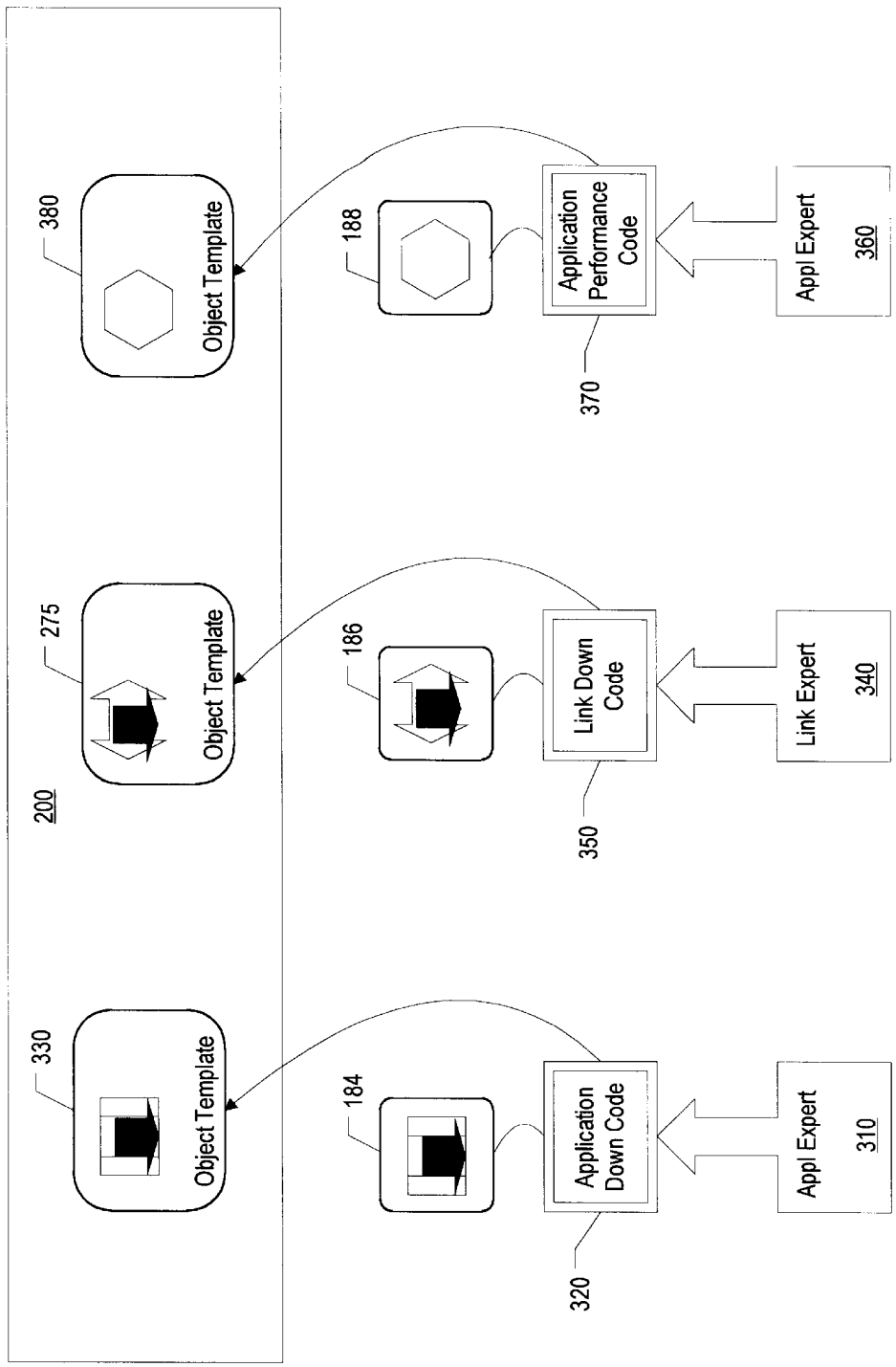
FIG. 3 is a diagram showing the creation of effect event templates by various subject matter experts.

FIG. 3 shows a continuation of the creation of object templates stored in object factory 200. In FIG. 3, the effect objects from FIG. 1 are shown being developed, coded, and placed in object factory 200. Application subject matter expert 310 prepares application down code 320 and associates application down code 320 with application down icon 184. Application down code 320 is then stored in object factory 200 as application down object template 330. While only one application down object template is shown in object factory 200, many object templates can coexist to handle events dealing with applications failing and corrective actions and diagnostics to determine why the application failed.

In addition, a general purpose application down object template could be created to handle events from several different applications, or event monitors, that failed. By having monitors passing data to application down object template 330, a unique instance of an object created from application down object template 330 could be spawned and tracked. Using inheritance techniques and abilities in object-oriented environments, the base class handles the generic processing for a given type, or class, of error. A child class inherits the capabilities of the base, or parent, class and builds upon the processing for more specifically handling a particular type of event.

If multiple application down events occur, each event would spawn a separate instance of application down object template 330 with unique data describing the application involved. Creating flexible object templates to handle more than one similar type of system component can also be used to act on different types of system component failures or problems. For example, a system may have several routers, each of which being monitored by one or more router monitors. If a router goes down, the event monitor would send data describing the particular router to the router down object template for general actions taken when a router goes down, such as notifying an administrator.

More than one object template can correspond to an event monitor so that multiple objects can be created when a particular event occurs. Furthermore, an object factory either creates a specific object instance for every event or, alternatively, creates one instance and instruct the object instance to keep track of the events being monitored. In this fashion, an event can trigger a general purpose object that is performed for all similar components, such as all routers, as well as a specific object template that is stored in object factory 200 and is used by the event factory to create the object instance that takes corrective action on specific router.

Using object oriented techniques, the general processing of a type of system component (i.e., routers) can be created as an object class. Specific objects (i.e., for a specific router) are then created from the router class with additional data that uniquely identifies the specific router and further identifies specific, rather than general, actions to be taken when this particular router fails.

Turning back to FIG. 3, link down object template 275 is shown being further developed by link subject matter expert 340 and using link down code 350. Link down object template 275 is found both as a cause event template (shown in FIG. 2) and as an effect event template, as shown here in FIG. 3. The same object template 275 is used to define actions to be taken when a link goes down and is a cause of another system event, or when some other component causes the link to go down. As stated before, many system components can act as both cause events and effect events. If a router goes down (cause), the result may be that the link goes down (effect). Similarly, when the link goes down (cause), the result may be that an application program also goes down (effect). These events may be consequently tied together forming an event correlation circuit. For example, an application program may go down because a needed link went down, and the particular link went down because of a particular router failed. This event correlation circuit would be application_program→link→router. After reviewing this event correlation circuit, a system administrator would likely start diagnosing the router, rather than the link, to correct the problem.

Not all events are triggered when a system component completely fails. For example, if a critical application program has minimum acceptable performance criteria, an event could be triggered when the performance level drops below the acceptable limit. In FIG. 3, application performance subject matter expert 360 prepares application performance code 370 and relates the code to application performance icon 188. Application performance code 370 is then placed in object factory 200 as application performance object template 380. When the performance level of the application program falls to a certain level, the application program's event monitor creates application performance object template 380 which, in turn, takes corrective action, such as notifying certain personnel, changing the application's priority level with the operating system, etc.

Figure 4:
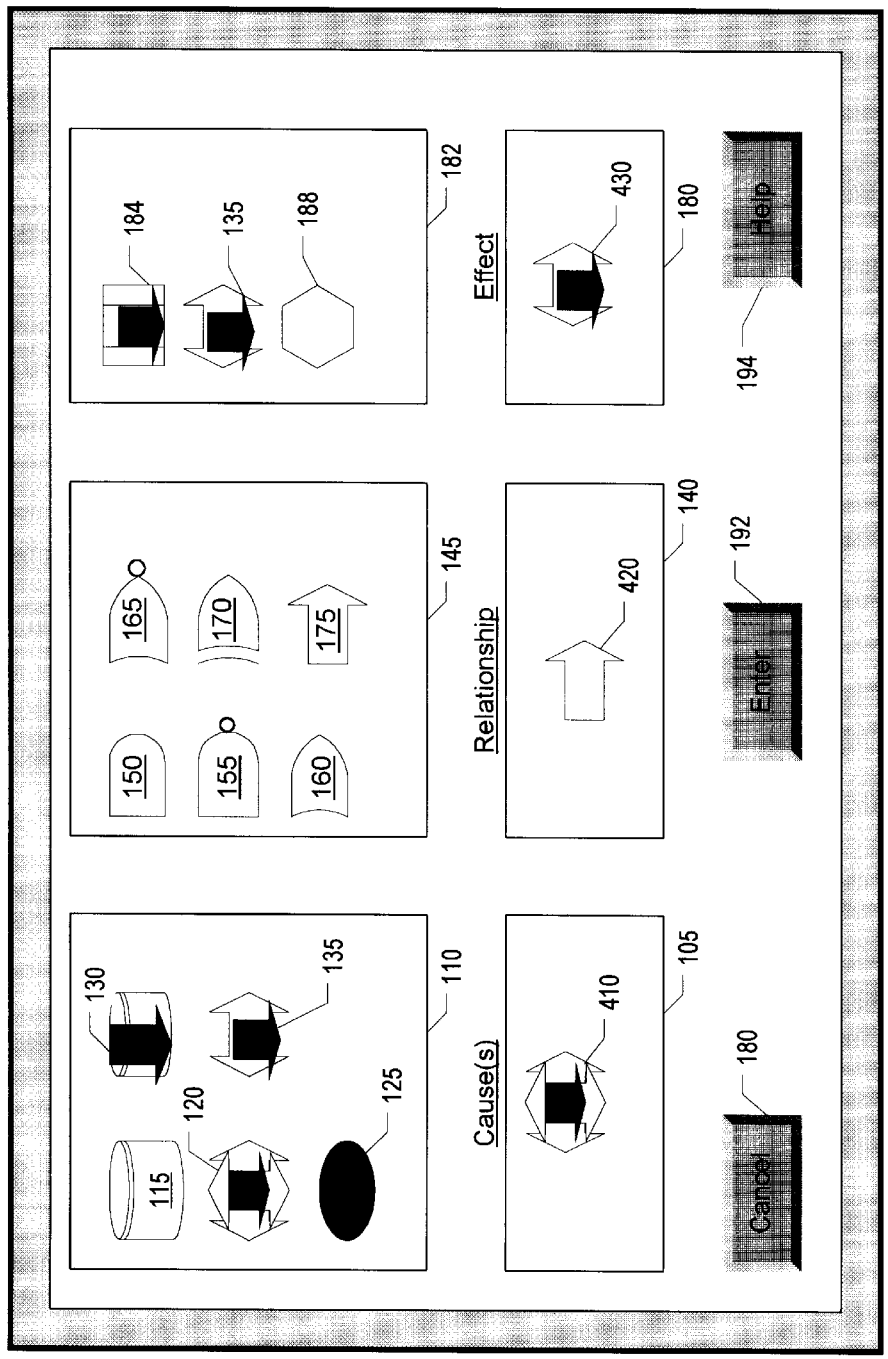
FIG. 4 is an example of a one-to-one correlation being made by a user correlating a cause event with an effect event.

FIG. 4 shows an example use of correlation screen 100 to correlate events. Router down icon 230 has been dragged into cause window 105 creating router cause icon 410. Similarly, one-to-one relationship icon 175 has been dragged into relationship window creating one-to-one relationship icon 420. Finally, link down icon 135 has been dragged into effect window 180 creating link effect icon 430. The correlation shown in FIG. 4 correlates the router event with the link event. More specifically, the correlation establishes that the router down event is a cause of the link down event. After dragging the cause, relationship, and effect, the user selects enter button 192 to establish the correlation in the event correlation system.

Preferably, the user can use additional tools within correlation screen 100 to customize actions to be taken when various correlations are made. Using a software toolkit with a graphical interface, the user could specify, for example, that a certain person should be paged when a database goes down. Creating flexible and reusable components to create actions takes advantage of the reusability inherent in object oriented programming languages and allows the user to customize actions that are taken on a particular system while subject matter experts concentrate on more complex tasks, such as diagnosing and solving problems that occur.

Figure 5:
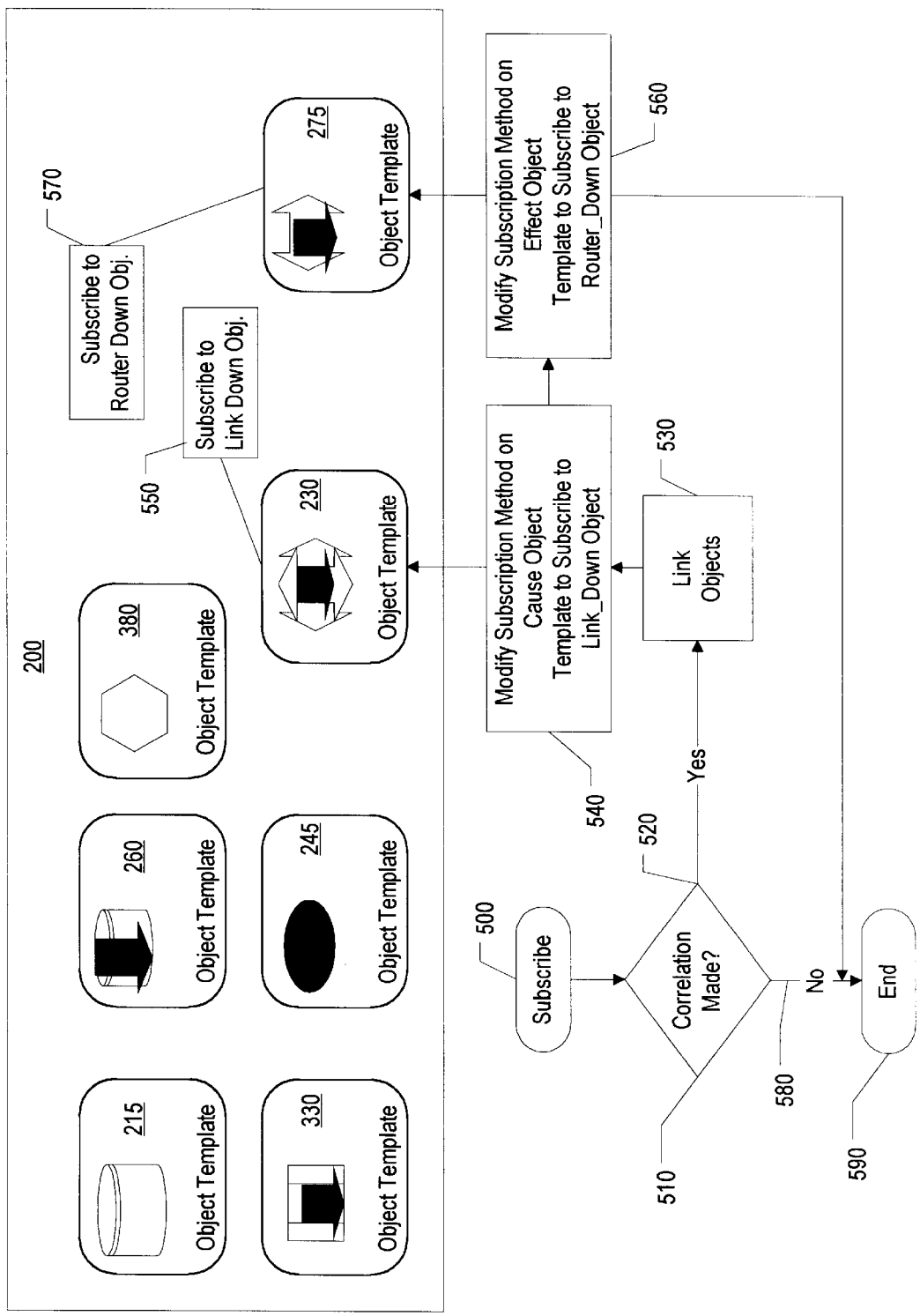
FIG. 5 is a system flow diagram showing subscriptions being made between the objects correlated by the user in FIG. 4.

FIG. 5 shows the system flow establishing the correlation between the router event and link event in the event correlation system. When the user selects enter 192 from correlation screen 100 in FIG. 4, subscribe process 500 is invoked. Decision (step 510) determines whether a valid correlation was made between events. If a valid correlation was selected by the user, "yes" branch 520 is taken and the objects are linked (step 530). Link step 530 creates subscription program code for both cause objects and effect objects. In FIG. 4, the user correlated the router object with the link object, so code is prepared to subscribe to the link object. Add subscription to cause object template (step 540) adds link down subscription code 550 to router down object template 230 located in object factory 200. Add subscription to effect object template (step 560) adds router down subscription code 570 to link down object template 275 located in object factory 200. Once subscriptions have been added to both objects, the objects have been correlated in object factory 200. Subscribe process 500 then terminates at end 590.

In an alternative embodiment, a subscription broker is used to facilitate object instances subscribing to one another. For a more detailed description of a subscription broker, see FIG. 14.

A modular approach to inter-object communication is provided in certain programming environments, such as with Java Beans. In Java Bean programming, rather than having an object, or "bean," call the methods of another object, the bean uses events instead. Those objects that are interested in the bean can subscribe to receive events sent by the bean. The bean maintains a list of its subscribers. When it wants to contact them, such as upon creation shown in FIG. 6, the bean publishes an event by sending it to each subscriber in turn. Other object oriented environments provide for other communication means for concurrent objects to communicate to one another, however a Java Bean implementation is one embodiment allowing for inter-object communications as described herein.

Figure 6:
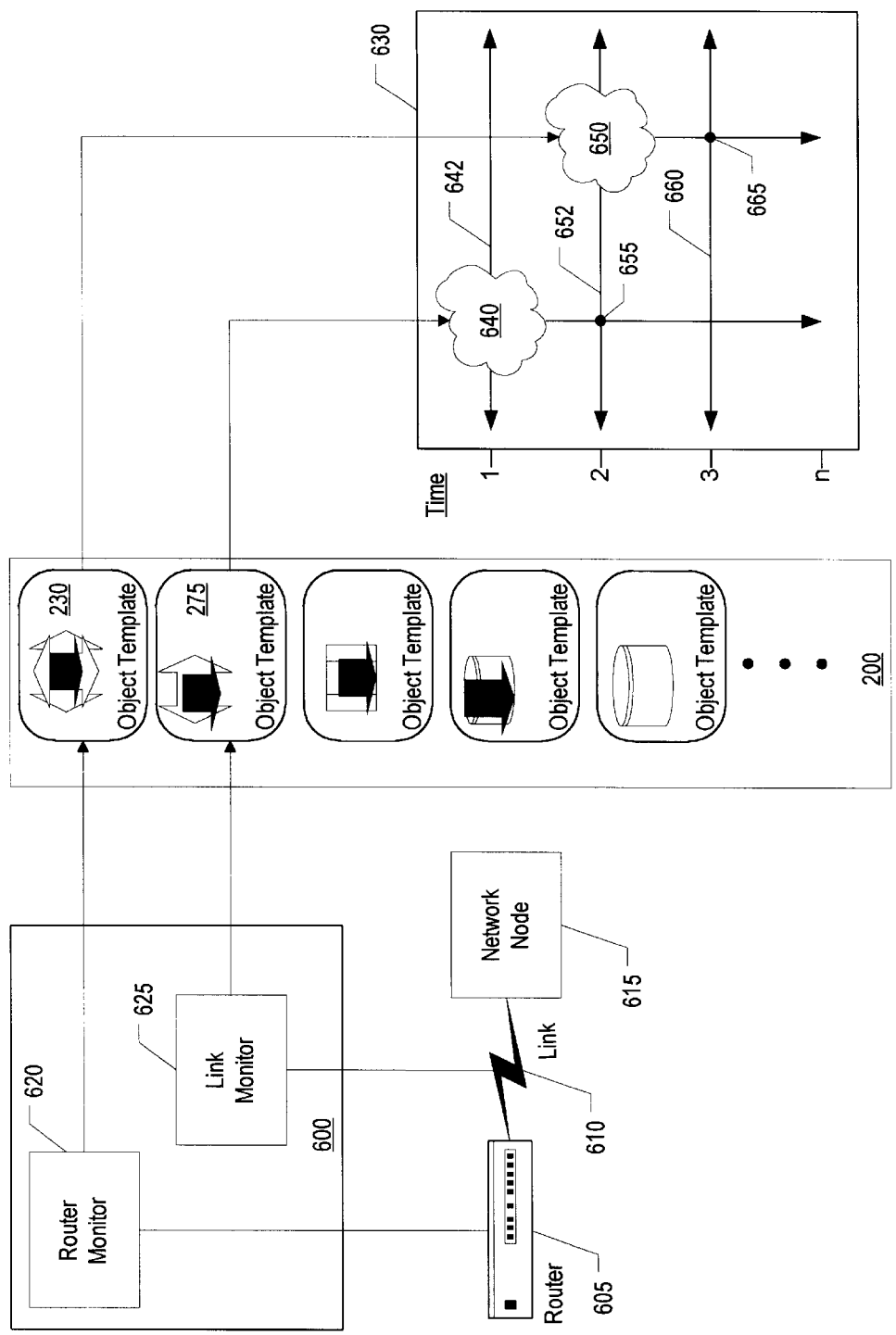
FIG. 6 is a system diagram showing object factories creating the objects correlated by the user in FIG. 4.

FIG. 6 shows an example of the correlation described by the user in FIG. 4 and established by the system in FIG. 5 being utilized in the computer system. Router 605 is monitored by router monitor 620 and link 610, linking router 605 with network node 615, is monitored by link monitor 625. In the example shown, link 610 has failed, link monitor 625 detects the failure and uses link down object template 275 located in object factory 200 to create link object instance 640 in object space 630. Object space 630 is the memory area where object instances operate. Object space 630 can be implemented in a variety of ways. Object space 630 could exist in the event monitor engine that monitors business systems, application programs, computer systems, and individual resources for events. Object space 630 could also exist in a correlation manager engine that is used to correlate objects with one another. Object space 630 can be centralized in one compute system or, as would be preferred by organizations with larger business systems, could be implemented as distributed agents running on the various networked computer systems. In a distributed system, object instances within object space 630 would communicate through inter-system communication protocols, such as TCP/IP.

When link object instance 640 is created at time T=1, it sends a link down subscription message 642 to object instances in event object space 630 that may be subscribed to link object instance 640. However, at T=1, no object instances exist that are subscribed to link object instance 640. Similarly, link object instance listens for any messages from other objects in event object space 630 to which link object instance 640 has been subscribed. Again, since no instances of objects currently exist in object space 630 to which link object instance 640 is subscribed, no connection is made between link object instance 630 and any correlated objects.

At T=2, router monitor 620 detects that router 605 has failed and uses router object template 230 from object factory 200 to create router object instance 650. Similarly to how link object instance 640 sent subscription messages and listened for subscription messages from other objects, router object instance 650 sends router down subscription message 652 to all other objects in event object space 630 that will be received by any objects that were subscribed to router object template 230. In this case, link object instance 640, which is subscribed to router object template 230 (and hence subscribed to the instance 650 of router object template 230), receives the message at first reception point 655. At T=3, link object instance 640, responding to its reception of router down subscription message 652, sends a follow up link down subscription message 660 since it knows that an object instance now exists that is subscribed to link down object instance 640. Router object instance 650 then receives the link down subscription message at second reception point 665.

In an alternative embodiment using a subscription broker, the subscription broker would facilitate subscriptions between object instances within object space 630. For a more detailed description of object brokers, see FIG. 14.

Because cause event objects and effect event objects are each subscribed to the other, the object instances will find each other in the object space regardless of which object is created first, thus preventing timing errors that could otherwise occur if the system relied on cause event objects occurring before the effect event objects (or vise versa).

Figure 7:
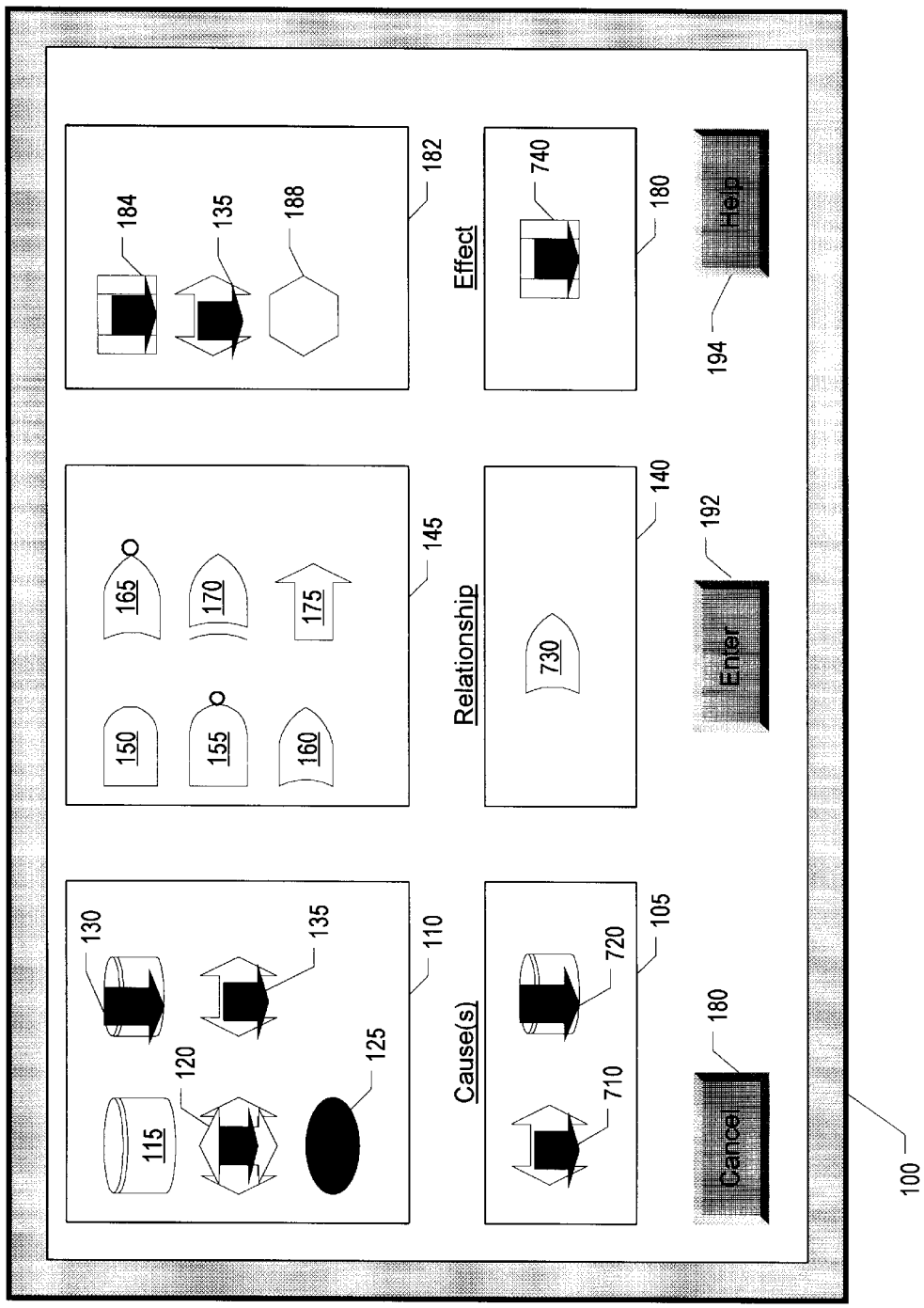
FIG. 7 is an example of a many-to-one correlation being made by a user correlating two cause events with an effect event.

FIG. 7 shows another example of a user using correlation screen 100 to establish correlations between cause event objects and effect event objects. In this example, user has created a multiple cause correlation by correlating either link down object 710 or database down object 720 with application down object 740 using logical OR relationship 730. In the example shown, either the link being down or the database being down are possible causes for the application going down.

Figure 8:
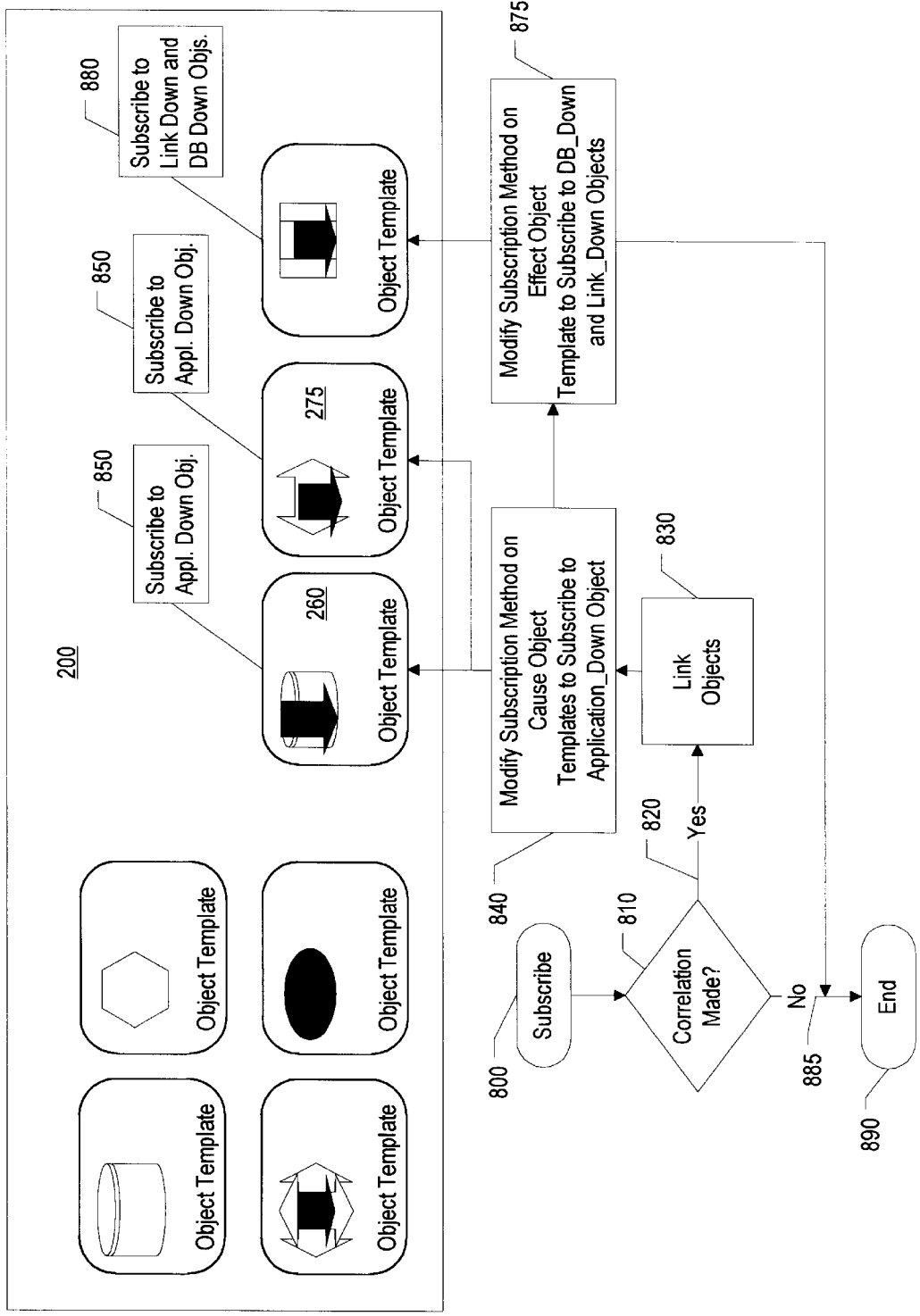
FIG. 8 is a system flow diagram showing subscriptions being made between the objects correlated by the user in FIG. 7.

FIG. 8 is similar to FIG. 5 and shows the system flow establishing the correlation between the events correlated in FIG. 7. To establish the correlations, subscribe process 800 is invoked whereupon decision (step 810) determines whether a valid correlation was made between events. If a valid correlation was selected by the user, "yes" branch 820 is taken and the objects are linked (step 830). Link objects process (step 830) creates subscription program code for both cause objects and effect objects. In FIG. 7, the user correlated both the link down object and the database down object with the application down object, so code is prepared to make the various subscriptions. Both the link down object and the database down object have code prepared to subscribe to the application down object, while the application down object has code prepared to subscribe to both the link down and database down objects. Add subscription to effect object template (step 840) adds application down subscription code 850 to both database down object template 260 and link down object template 275 both of which are located in object factory 200. Add subscription to cause object template (step 560) adds database down and link down subscription code 880 to application down object template 330 also located in object factory 200. The objects are correlated in object factory 200 once subscriptions have been added to all three objects. Subscribe process 800 then terminates at end 890.

Figure 9:
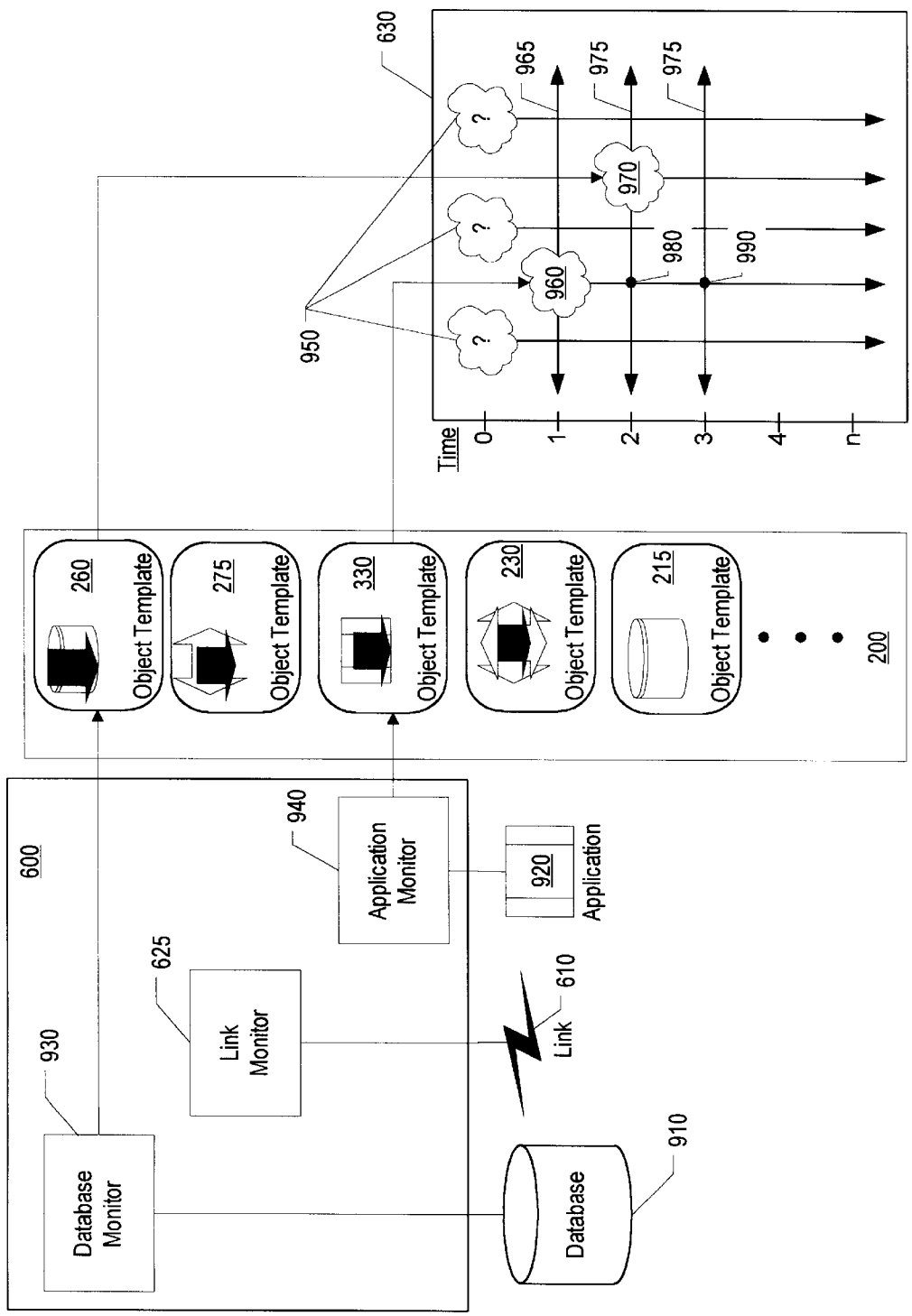
FIG. 9 is a system diagram showing object factories creating the objects correlated by the user in FIG. 7.

FIG. 9 shows an example of object space 630 acting upon the correlations established as shown in FIGS. 7 and 8. Database management system 910 is monitored by database monitor 930, link 610 is monitored by link monitor 625, and application program 920 is monitored by application monitor 940. In the example shown, database management system 910 has failed causing application program 920 to also fail. In order to detect the cause and effect events causing the system problem, object space 630 is utilized.

In this case, application monitor 940 detected that application program 920 has failed and uses application down object template 330 in object factory 200 to create application down object instance 960 in object space 630 at time T=1. At T=1, or shortly thereafter, application down object instance 960 sends first message (or signal) 965 to other objects in object space 630. First message 965 received by any objects that are in existence in object space 630 and subscribed to application down object template 330. Before application down object instance 960 was created, other unknown object instances 950 already were in existence in object space 630. However, unknown objects 950 are not subscribed to application down object template 330 so, consequently, none of the other objects receives first message 965.

At time T=2, database monitor 930 detected that database management system 910 has failed and uses database down object template 260 located in object factory 200 to create database down object instance 970 in object space 630. At time T=2, or shortly thereafter, database down object instance 970 sends second message 975 to other objects in object space 630. Again, unknown objects 950 are not subscribed to database down object template 260 and so they do not receive second message 975. Application down object instance 960, however, is still in existence and receives second message 975 at reception point 980. Now, application down object instance 960 responds to the detection of an object to which it is correlated by sending out third message 985 at time T=3, or sometime after receiving second message 975. Third message 985 is detected by database down object instance 970, which is still in existence, at second reception point 990. At this point, both objects are aware of the other object's existence and a full correlation circuit has been made.

In FIG. 7, the user established a logical OR relationship so that either database 910 or link 610 could be the cause event causing a failure in application 920. At time T=3, object space 630 has established that database is a likely cause for application 920's failure. However, since the relationship is a logical OR relationship, it is not unlikely that link 610 may be a cause event for application 920's failure. Accordingly, objects may be programmed to periodically send further messages to other objects in object space 630 to determine if, at a later time, another correlated object is in existence in object space 630.

In addition to the cause and effect objects shown in FIG. 9, many other correlations may exist between other cause events and other effect events in the computer system. Link 610 may, for example, be a cause event for application program 920, and a router (not shown in FIG. 9) may, in turn, be the cause event for link 610's failure. In this fashion, correlation circuits can be established indicating that link 610 caused application program 920 to fail and that the router caused link 610 to fail. Consequently, a system administrator would realize that fixing the router would likely fix both link 610 and the application program 920. Establishing the most likely system component that is the true culprit causing system failures saves the organization time and money and results in the computer system being back in operation sooner and system administrators working more effectively in maintaining the computer system.

Figure 10:
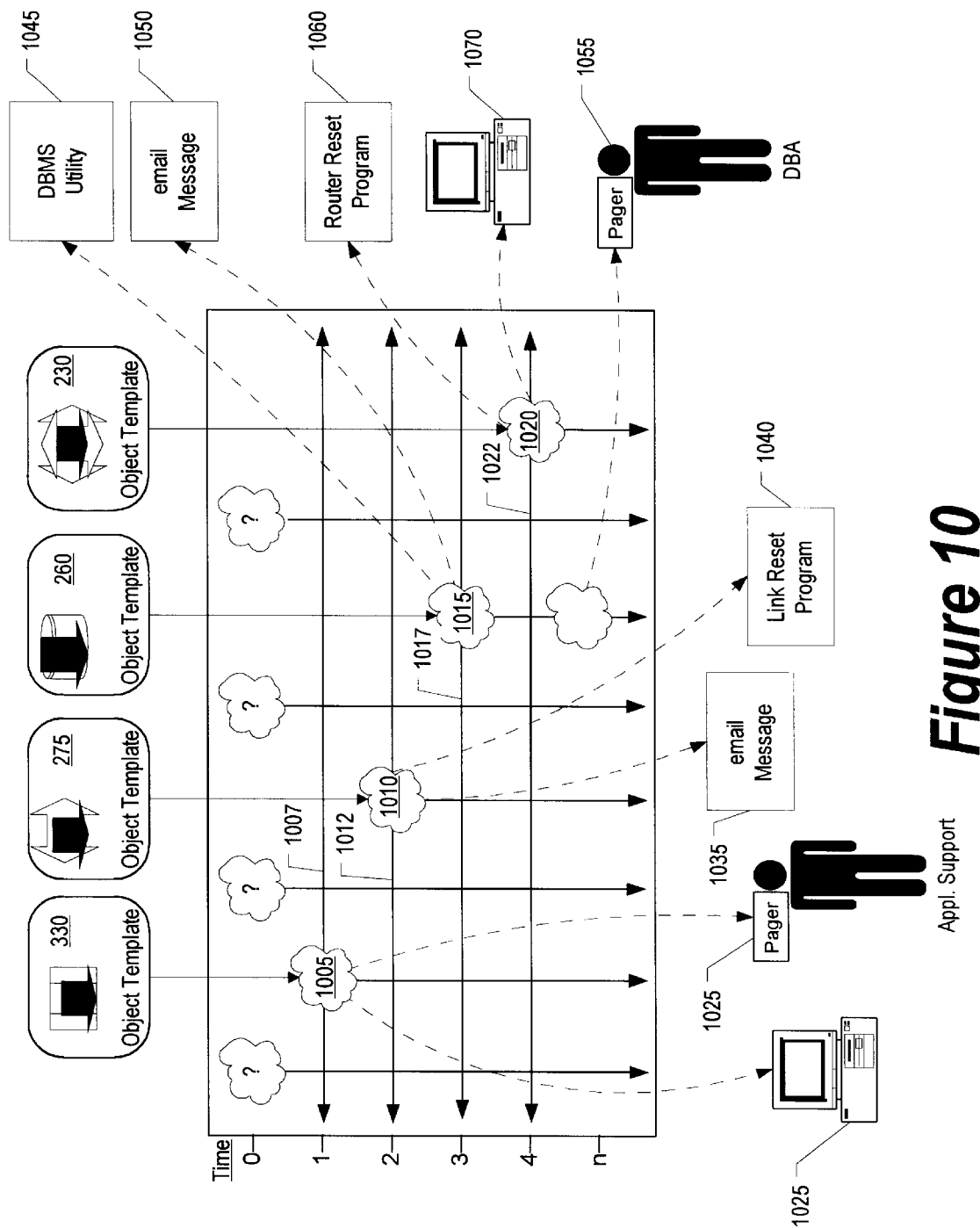
FIG. 10 is system diagram showing actions taken by various objects in order to resolve the various events.

FIG. 10 shows examples of actions taken by objects within object space 630. In FIG. 10, application down object instance 1005 was created by application down object template 330, link down object instance 1010 was created by link down object template 275, database down object instance 1015 was created by database down object template 260, and router down object instance 1020 was created by router down object template 230. FIGS. 2 and 3 showed how object templates are developed by subject matter experts in order to facilitate the handling of errors or failures received from system components.

In FIG. 10, at time T=1, application down object instance 1005 has sent a message to system administrator console 1025 informing the system administrator of the application failure and a page was sent through the public switched telephone network to application support person 1030 informing the person on call for the application that a failure has occurred. Application down object instance 1005 also sends subscription message 1007 to notify any objects subscribed to it that application down object instance is in existence. Notice that at time T=1, no objects exist in the object space that are subscribed to application down object instance 1005.

At time T=2, link down object instance 1010 is created and sends email message 1035 to someone (or a group of people) in charge of maintaining the link. In addition, link down object instance 1010 calls link reset program 1040 to attempt to restart the link. Link down object instance 1010 also sends subscription message 1012 to notify any objects subscribed to it that link down object instance is in existence. Notice that at time T=2, the application down object instance receives the subscription message and responds appropriately to inform link down object instance 1010 that application down object instance 1005 already exists in object space 630.

At time T=3, database down object instance 1015 is created and calls database management system utility 1045 in order to try and restart the database. Database down object instance 1015 also sends email message 1050 to a database administrator (DBA) or someone in charge of maintaining the database. At time T=n (sometime after T=2), if database down object instance 1015 is still in existence, it sends a page to DBA 1055 so that the DBA will know that the database is still down and is experiencing problems. Database down object instance 1015 also sends subscription message 1017 to notify any objects subscribed to it that database down object instance is in existence. Notice that at time T=3, the application down object instance receives the subscription message and responds appropriately to inform database down object instance 1015 that application down object instance 1005 already exists in object space 630.

At time T=4, router down object instance 1020 is created and calls router reset utility 1060 in order to try and restart the router. Router down object instance 1020 also sends message 1070 to a system administrator or someone in charge of maintaining the router. Router down object instance 1020 also sends subscription message 1022 to notify any objects subscribed to it that database down object instance is in existence. Notice that at time T=4, link down object instance 1010 receives the subscription message and responds appropriately to inform router down object instance 1020 that link down object instance 1010 already exists in object space 630.

In a real world example of actions taken within object space 630, it is likely that subject matter experts would attempt to first try automated recovery tasks, such as reset routines, before notifying systems personnel via pagers and emails. It is also likely that object instances would wait some amount of time to collect subscriptions from correlated objects so that a more efficient system wide course of action could be taken. In addition, by waiting an error condition may correct itself without any corrective action being taken. For example, a system load situation may be corrected by applications terminating or requesting fewer system resources. In FIG. 10, an application, router, database, and link all failed. It is possible that one of the components, such as the router, created a domino-effect causing the other components to also fail. By waiting until other event monitors have created object instances, a better picture of the system conditions may be determined and used to direct attention towards the failing unit, such as the router.

Figure 11:
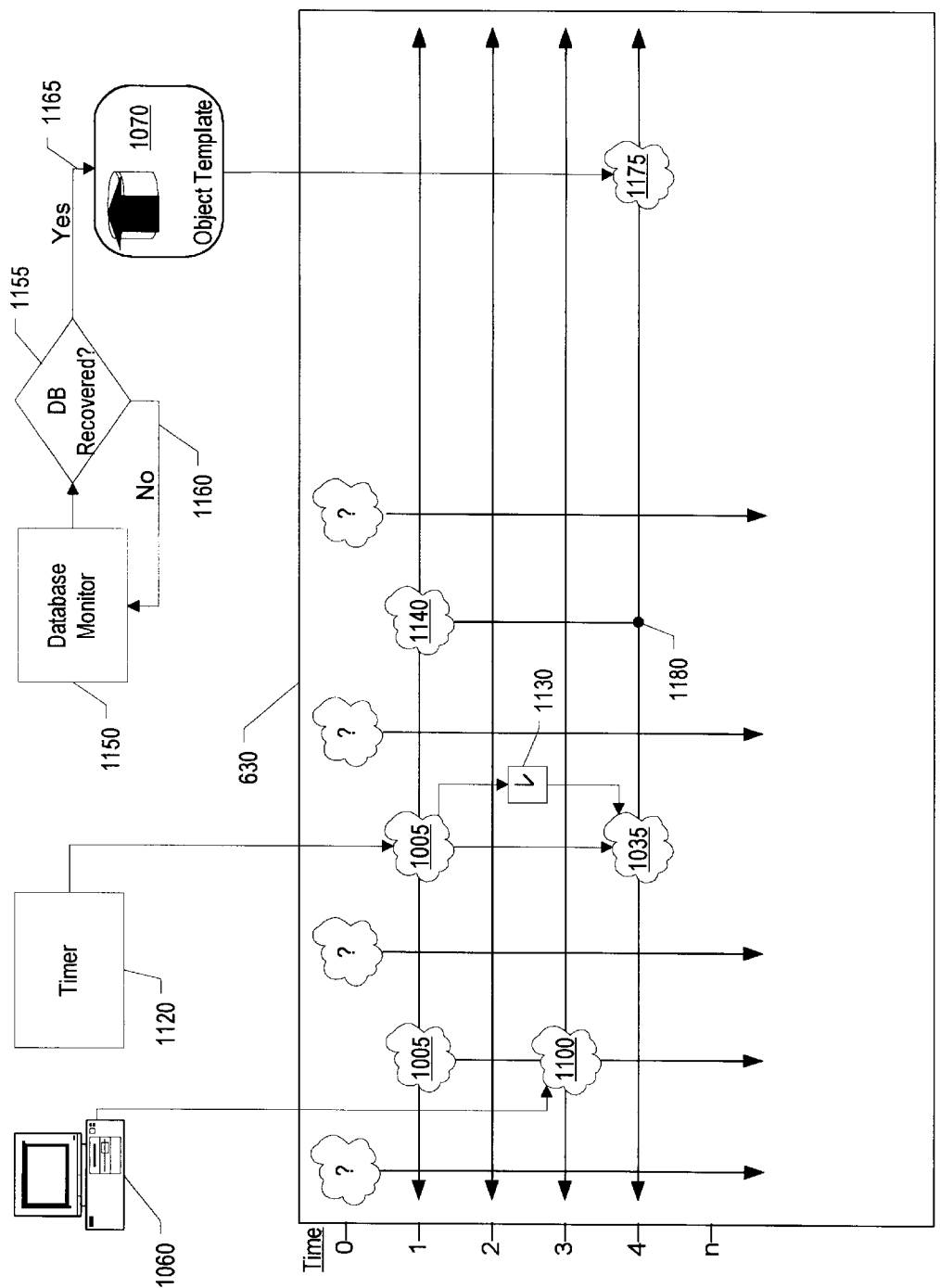
FIG. 11 is a system chart showing the clean up of objects forming event correlation circuits.

FIG. 11 shows various ways of removing object instances once the associated system errors are corrected or some other system event occurs. Object space 630 includes many object instances that are removed from the object space upon some condition, such as the underlying problem being corrected, or some other event, such as a timer designed to remove the object instance after an allotment of time.

System administrator 1100 sends message 1102 instructing object instance 1105 to terminate. Object instance 1105 is shown being created at time T=1. At time T=3, object instance 1105 receives message 1102 and terminates at 1110. Termination messages, such as message 1102, could be sent by various individuals or applications with object instances programmed to act upon the reception of such messages by terminating. Messages can also be used to set an internal timer in an object instance.

Timer 1120 can be established (1) internally to the object by being programmed into the object template that creates the object instance, and/or (2) externally to the object and set by a monitor or by object space 630. As shown, timer 1120 sets time value 1130 for object instance 1125. In this case, the timer is set to allow the object to exist for three time intervals (from time T=1 to time T=4). At time T=4, timer 1130 has expired and object instance 1125 terminates at 1135.

Objects include four methods for communicating with other objects. As previously described, the subscribe method requests publications issued by other objects. In addition, the publish method is used to send information to objects that are subscribed to an object. Two other methods are useful in communicating with other objects, especially in cleaning up objects within the object space. First, the unpublish method is useful to inform other objects that an object is terminating. If another object is subscribed to the object, it will get the unpublish message and realize that something has changed with respect to a cause or effect event in the system. The other objects can then take action, such as monitoring the system to determine if an error situation still exists. Second, the unsubscribe method is used to tell another object that an object is no longer interested in receiving information that the other object publishes. Again, the unsubscribe method is useful in communicating with other objects about the status of an object.

Additionally, the object instance-can monitor the event that caused its creation. The object instance can inherit the filtering information from the event monitor that caused the object to be created or can include other filtering information used to monitor the business application, application program, computer system, or individual resource. Once the condition causing the object is resolved, the object can be programmed to automatically terminate.

Objects that are not removed from object space 630 eventually may become orphaned from the correlation circuits that exist within object space 630. A cleanup routine can cleanup orphaned objects that have not terminated by first identifying the orphaned objects and then removing them from object space 630. A cleanup routine can subscribe to objects that may exist in object space 630. Periodically, the cleanup routine determines how long the object has been instantiated within object space 630—the longer the object has been instantiated the better the chance that the object is orphaned. The cleanup routine also checks to see if the object is currently a part of a correlation circuit. Objects that are not part of a correlation circuit are more likely to be orphans because non-orphaned objects are prone to be the cause or effect of a problem occurring in the system. Once an orphan has been identified, it can be terminated by the cleanup routine. If the object is not really orphaned, the system will recover by having the event monitor re-create the cause or effect object within object space 630.

Finally, an application program, such as database monitor 1150 can cause an instance of a termination object to be created that is subscribed to by certain object instances in object space 630. When a target object gets a message that the termination object is present in object space 630, the target object instance terminates. Waiting for a termination object instance is somewhat like acting on a semaphore in multithreaded applications. When the semaphore is set, the thread, in this case an object instance, terminates. As shown in the example in FIG. 11, database monitor detected that the database is down and created database down object instance 1140. Thereafter, database monitor 1150 checks to see if the database is back up (decision 1155). If the database is not back up, the monitor takes "no" branch 1160 and loops through the monitoring software again. However, if decision 1155 is true, i.e., the database is recovered, "yes" branch 1165 is taken causing database recovered object instance 1175 to be created in object space 630 from database recovered object template 1170. When database recovered object instance 1175 is created at time T=4, it sends a message out to any other objects that are subscribed to it, much like the subscription processing described in FIGS. 6 and 9. When database down object instance 1140 receives the subscription message, database down object instance 1140 is terminated shortly after receiving the message at reception point 1180.

Figure 12:
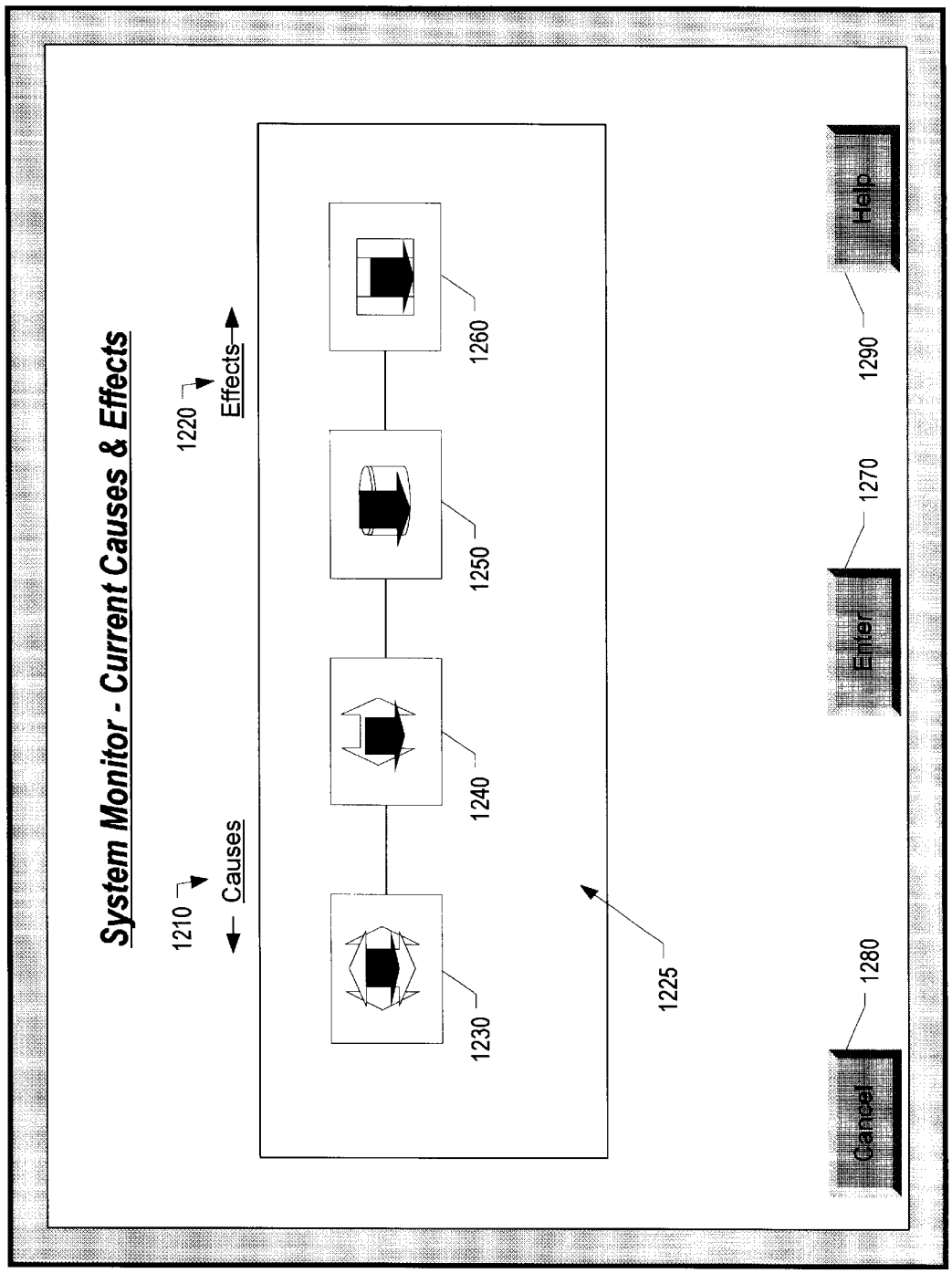
FIG. 12 is a sample screen of a system monitor showing a correlation circuit of causes and effects currently existing in the system.

FIG. 12 shows an example of system monitor 1200 that is displaying a correlation circuit on a system administrator's display that is monitoring the system. Information about the objects is captured from object space 630 (seen in FIG. 11). The system monitor can be subscribed to objects in the object space much like objects are subscribed to one another. The system administrator can then choose the level of detail to be displayed on system monitor 1200. For a high level view of the system, the system administrator would choose a business system object that would show the cause and effect objects currently existing for events within the business system. Alternatively, the system administrator could choose lower level details, such as an application system object, a computer system object, or an individual resource object.

In FIG. 12, an application system has failed and the administrator has chosen application down object 1260 in order to understand what may have caused the application to fail. In system monitor 1200, correlation circuit 1225 is shown with causes 1210 displayed on the left and corresponding effects 1220 displayed on the right side of the screen.

Four objects are shown in correlation circuit 1225. The application down object 1260 is shown on the far right and is thus the net effect of the circuit. Application down object 1260 appears to be down because the database is down, as indicated by database down object 1250. The database is in turn down because the link is down, as indicated by link down object 1240. Finally, the link is down because the router is down, as indicated by router down object 1230. By using system monitor 1200, the system administrator is likely to quickly realize that the real culprit behind the application failing is likely because the router has failed. Time will likely be saved by first diagnosing the router and resolving the failure associated with it. Once the router is fixed, the link error, database error, and application errors may all be resolved without having to individually diagnose each of these components.

If the system administrator is taking a particular action (i.e., terminate) with the displayed objects, he or she may select enter button 1270 to cause the action to take place. For help, the system administrator may select help button 1290, and to cancel out of the screen, the system administrator selects cancel button 1280.

In one embodiment, the objects (1230, 1240, 1250, and 1260) shown on system monitor 1200 can be selected by the administrator with a mouse, keyboard, or other selecting device. Once selected, information about the object, such as the time in which the object was created, the elapsed time since the object was created, what actions have been taken by the object (such as those shown in FIG. 10), and what future actions are scheduled to take place for the object. Additionally, an interface can be provided for the administrator using system monitor 1200 to alter or modify the actions to be taken as well as provide instructions to one or more objects to terminate.

To instruct a single object to terminate, the administrator would select the object, such as using a right-button mouse selection, whereupon a context menu would appear giving the administrator the option of terminating the object. To terminate multiple objects, the administrator could either individually select the objects, such as by pressing a key combination such as the "control" key along with the mouse selection, or the administrator could hold a mouse button down and drag a box around a group of objects to be terminated and give the instruction, through a menu or keyboard command, to terminate the group of objects.

Figure 13:
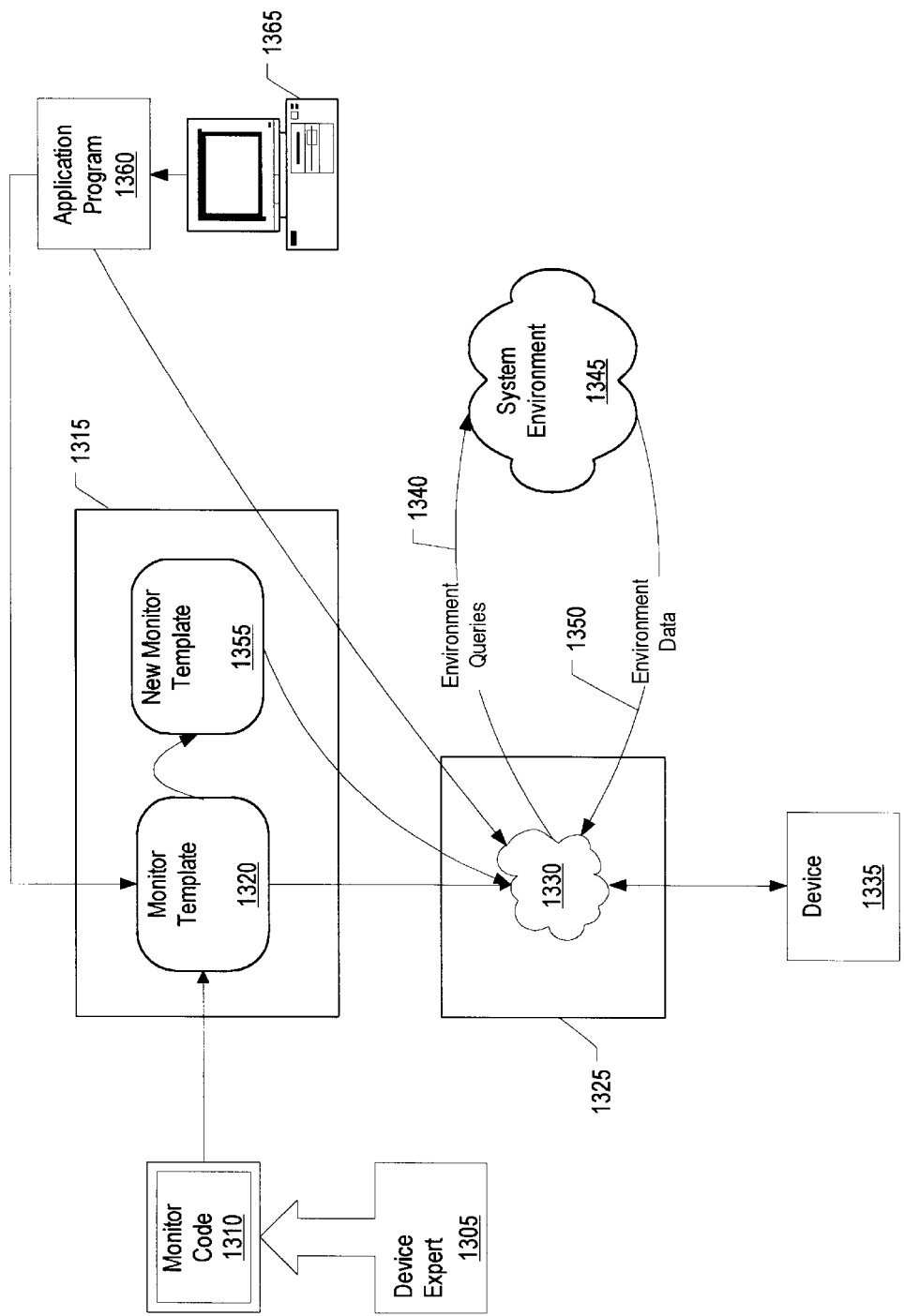
FIG. 13 is a system diagram showing actions taken by an object oriented event monitor system.

FIG. 13 is a system diagram of an object oriented event monitor system that is used to monitor devices and applications in the computer system. Event monitor subject matter expert 1305 writes code 1310 that is used to create event monitor object template 1320 that is placed in event monitor object factory 1315. Event monitor object template 1320 corresponds with a certain device or class of related devices. Similar to the cause and effect object templates shown in FIGS. 2 and 3, an event monitor object template is created for each device (or class of device) that will be monitored by the system. Similar to object factory 200 (shown in FIGS. 2 and 3), event monitor object factory 1315 stores object templates for monitor objects used in the system.

Event manager 1325 uses the various event monitor object templates stored in event monitor object factory 1315 to create event object instances. In the example shown, event monitor object template 1320 is used to create event monitor object instance 1330. Event monitor object instance 1330 then monitors device 1335. Unlike conventional systems, object oriented event monitors are dynamically configurable based on the system environment. As shown, event monitor object instance 1330 executes environment queries 1340 upon system environment 1345 and receives environment data 1350. For example, if the event monitor was monitoring a disk array, the monitor may be pre-configured to trigger a disk error event when the disk is 90% full. However, based on the system environment, the monitor could determine that a predefined job was running using a large amount of temporary disk space that will be relinquished in a short amount of time. Based on this information, the event monitor could dynamically re-configure itself to trigger a disk error event when the disk array is 95% full. When the environment data changes again, the event monitor could re-configure itself back to its predetermined configuration.

The dynamically alterable event monitor can also be re-configured by an external application program 1360 or by system administrator 1365. Either before or after an error event is triggered by event monitor object instance 1330, system administrator 1365 can select a different filter, or configuration, for the event monitor (for example, setting the disk error threshold from 90% to 95%). If the new setting is intended to be a permanent change, event monitor object template 1320 is changed forming new monitor object template 1355 with the new configuration settings. As a self-aware object, event monitor object instance 1330 senses that its underlying template has changed and reconstructs itself based upon new monitor object template 1355 with the new device filtering settings. Alternatively, a temporary change can be issued by having application program 1360 send a message to event monitor object instance 1330 with instructions to alter its device filtering settings.

Figure 14:
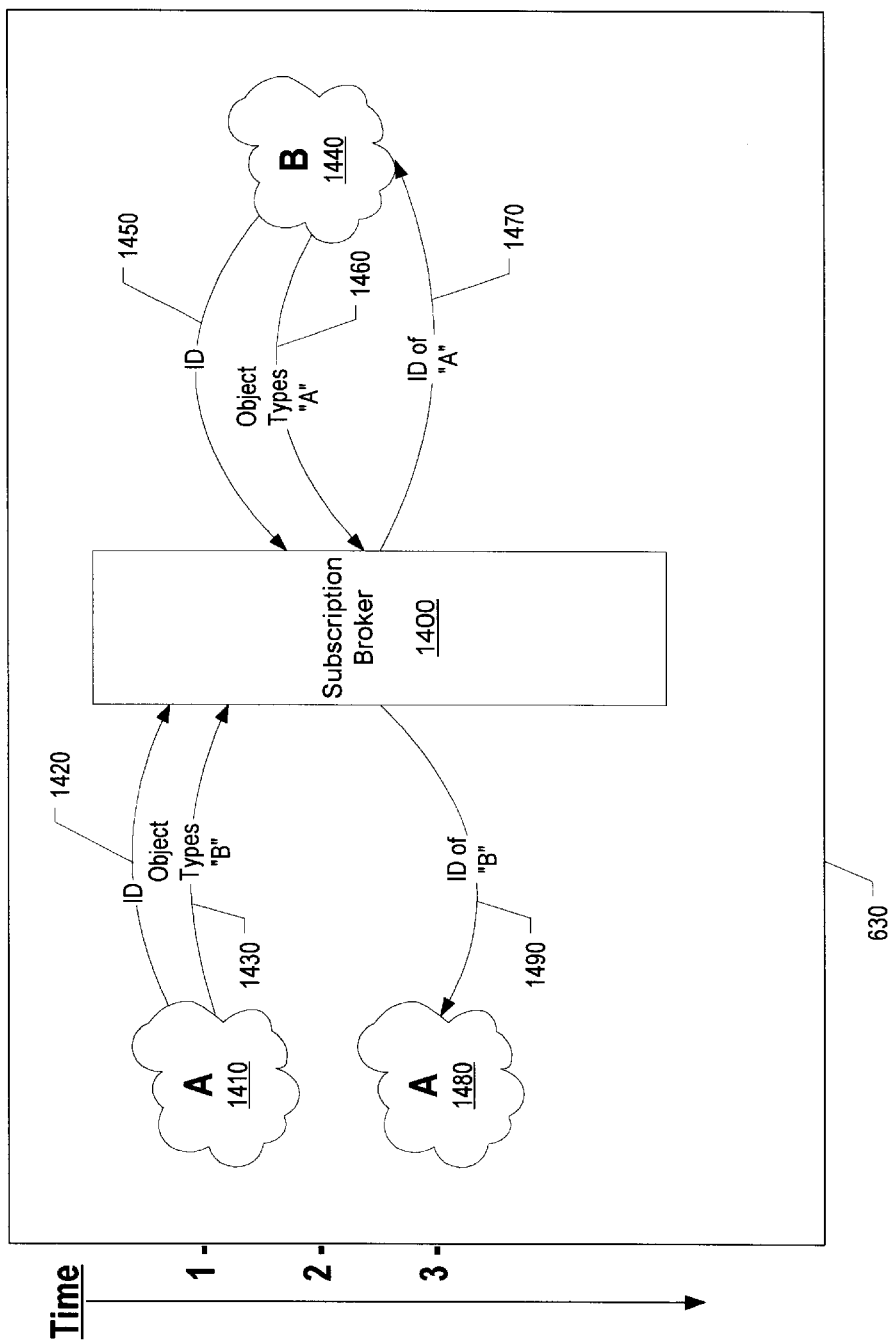
FIG. 14 is a diagram showing a subscription broker facilitating subscriptions between object instances.

FIG. 14 shows an alternative embodiment of subscribing using a subscription broker, rather than directly subscribing to other objects as shown in FIGS. 5 and 8. In a subscription broker implementation, objects communicate with a common object, called a subscription broker, that facilitates the communication between cause and effect object instances.

Object space 630 is shown with subscription broker 1400 at various points in time. At time T=1, object instance A 1410 sends subscription broker 1400 its identifier, or A's handle 1420, and the object types in which A is interested (object types "B" 1430). Subscription broker 1400 is now able to communicate with object instance A 1410 because it has A's handle 1420. Subscription broker 1400 is also able to inform object instance A 1410 if an object type "B" exists in object space 630. At time T=1, no object types "B" exist in object space 630.

At time T=2, however, an object of type "B" (object instance B 1440) is created within object space 630. At time T=2, object instance B 1440 sends subscription broker 1400 its identifier, or B's handle 1450, and the object types in which B is interested (object types "A" 1430). Subscription broker 1400 now makes the connection for object instances A and B. When object B informed object broker 1400 that it was interested in any object types of "A", subscription broker responds to object B with the identification of A (A's handle 1470). Subscription broker 1400 stored the fact that object A requested to be informed of any objects of type B, and is able to respond to object A (object instance A 1480) with the identification of B (B's handle 1490) at time T=3. At this point, object A and object B can communicate directly with one another. In addition, object broker 1400 can continue to facilitate communication between the objects by receiving the messages published by the objects and passing them along to the objects that subscribed to that object type.

Before an object terminates, it performs its unpublish and unsubscribe methods. The unpublish method informs subscription broker 1400 that the subscription broker should no longer inform newly created object instances that the object exists within object space 630. The unsubscribe method tells subscription broker 1400 to stop sending the object instance messages (since the object instance will soon terminate).

The event monitor screen (shown in FIG. 12) can be subscribed to subscription broker 1400 requesting the object types in which the user of the event monitor is interested. As with the direct subscription embodiment (described in FIGS. 5 and 8), object space 630 shown in FIG. 14 can exist across a number of disparate types of computing platforms within an organization's computing network.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for handling orphaned causes and effects, said method comprising:
   determining a total number of objects from an object space, wherein the objects are adapted to monitor network devices included in an enterprise computing system;
   creating one or more correlation circuits, the correlation circuits including a plurality of cause and effect event objects, wherein the cause evens objects indicate a cause of a problem and are associated with at least one effect event objects, the effect event objects indicating a predicted effect of the associated cause event object; and
   identifying one or more orphaned objects, wherein the orphaned objects are selected from the group consisting of cause event objects and effect event objects but are not included in the one or more correlation circuits; and
   removing the identified orphaned objects.

2. The method of claim 1 wherein the creating one or more correlation circuits further comprises:
   sending a message from a first object to the plurality of objects;
   receiving replies from the plurality of objects in response to the sending; and
   correlating the first object to at least one of the plurality of objects based on the receiving of replies.

3. The method of claim 2 wherein the receiving is in response co the first object previously subscribing to one or more of the plurality of objects.

4. The method of claim 1 further comprising:
identifying the plurality of objects by a subscription broker; and
searching subscription information accessible by the subscription broker to determine one or more non-correlated objects from the plurality of objects.

5. The method of claim 1 wherein the object space is stored across a plurality of computer systems, the plurality of computer systems being interconnected through a computer network.

6. The method of claim 1 further comprising:
correlating the one or more of the total number of objects not included in the one or more correlation circuits with at least one object from the total number of objects.

7. The method of claim 1 further comprising:
displaying the one or more identified objects.

8. An information handling system for associating causal events with predicted effects, said method comprising:
a computer, the commuter including:
one or more processing units;
a network interface connecting the information handling system to one or more computer systems, wherein the information handling system and the computer systems form an enterprise computing system;
a memory operatively coupled to the one or more processing units; and
an object space stored in the memory;
one or more objects, the objects stored in the object space, wherein the objects are adapted to monitor network devices included in an enterprise computing system;
a total number of objects;
one or more correlation circuits, the correlation circuit including a plurality of cause and effect objects, wherein the cause event objects indicate a cause of a problem and are associated with at least one effect event objects, the effect event objects indicating a predicted effect of the associated cause event object; and
one or more orphaned objects, wherein the orphaned objects are selected from the group consisting of cause event objects and effect event objects but are not included in the one or more correlation circuits; and
means for removing the identified orphaned objects.

9. The information handling system of clam 8, further comprising:
a message, the message sent from a first object to the plurality of objects;
one or more replies, the replies received by the first object in response to the message; and
a correlation between the first object and at least one of the plurality of objects based on the replies received by the first object.

10. The information handling system of claim 9 wherein the replies are sent in response to a subscription between the first object and at least one of the plurality of objects.

11. The information handling system of claim 8 further comprising:
a subscription broker, the subscription broker identifies at the plurality of objects; and
subscription information accessible by the subscription broker identifying one or more non-correlated objects from the plurality of objects.

12. The information handling system of claim 8 further comprising:
a plurality of computer systems, each including one or more processors and a memory, wherein the plurality of computer systems include the computer system;
a computer network interconnecting the plurality of computer systems; and
wherein the object space is stored within the memories of the plurality of computer systems.

13. The information handling system of claim 8, further comprising:
a correlation between the one or more of the total number of objects not included in the one or more correlation circuits and at least one object from the total number of objects.

14. The information handling system of claim 8, further comprising:
a display device, the display device displaying the one or more identified objects.

15. A computer operable medium handling orphaned causes and effects, said medium comprising:
means for determining a total number of objects from an object space, wherein the objects are adapted to monitor network devices included in an enterprise computing system;
means for creating one or more correlation circuits, the correlation circuits including a plurality of cause and effect event objects, wherein the cause event objects indicate a cause of a problem and are associated with at least one effect event objects, the effect event objects indicating a predicted effect of the associated cause event object; and
means for identifying one or more orphaned objects, wherein the orphaned objects are selected from the group consisting of cause event objects and effect event objects but are not included in the one or more correlation circuits; and
means for removing the identified orphaned objects.

16. The computer operable medium of claim 15 wherein the means for creating one or more correlation circuits further comprises:
means for sending a message from a first object to the plurality of objects;
means for receiving replies from the plurality of objects in response to the message; and
means for correlating the first object to at least one of the plurality of objects based on The replies.

17. The computer operable medium of claim 16 wherein the replies are in response to the first object previously subscribing to one or more of the plurality of objects.

18. The computer operable medium of claim 15 further comprising:
means for identifying the plurality of objects by a subscription broker; and
means for searching subscription information accessible by the subscription broker to determine one or more non-correlated objects from the plurality of objects.

19. The computer operable medium of claim 15 wherein the object space is stored across a plurality of computer systems, the plurality of computer systems being interconnected through a computer network.

20. The computer operable medium of claim 15 further comprising:
means for correlating the one or more of the total number of objects not included in the one or more correlation circuits with at least one object from the total number of objects.

* * * * *

UNITED STATES PATENT AND TRADEMARK OFFICE
CERTIFICATE OF CORRECTION

PATENT NO.   : 6,735,772 B1
DATED        : May 11, 2004
INVENTOR(S)  : MacPhail

It is certified that error appears in the above-identified patent and that said Letters Patent is hereby corrected as shown below:

Column 20,
Line 46, please delete "evens" and insert -- events --.
Line 48, please delete "objects," and insert -- object, --.
Line 50, please delete "and".
Line 65, please delete "co" and insert -- to --.

Column 21,
Line 18, please delete "method" and insert -- information handling system --.
Line 38, please delete "objects," and insert -- object, --.
Line 40, please deelte "and".

Column 22,
Line 28, please delete "objects," and insert -- object, --.
Line 30, please delete "and".
Line 45, please delete "The" and insert -- the --.

Signed and Sealed this

Second Day of November, 2004

JON W. DUDAS
*Director of the United States Patent and Trademark Office*